US007774229B1

(12) United States Patent
Dernehl et al.

(10) Patent No.: US 7,774,229 B1
(45) Date of Patent: Aug. 10, 2010

(54) METHODS OF ANTI-SPAM MARKETING THROUGH PERSONALIZED REFERRALS AND REWARDS

(75) Inventors: Howard Dernehl, Palo Alto, CA (US); James E. Kleckner, Palo Alto, CA (US); Robert A. Fraley, Palo Alto, CA (US)

(73) Assignee: r-coupon.com, Inc., Palo Alto, CA (US)

( * ) Notice: Subject to any disclaimer, the term of this patent is extended or adjusted under 35 U.S.C. 154(b) by 1379 days.

(21) Appl. No.: 11/217,871

(22) Filed: Aug. 31, 2005

Related U.S. Application Data

(63) Continuation-in-part of application No. 09/635,994, filed on Aug. 9, 2000.

(60) Provisional application No. 60/147,964, filed on Aug. 9, 1999.

(51) Int. Cl.
 *G06Q 30/00* (2006.01)
(52) U.S. Cl. ............... 705/14.16; 705/14.1; 705/14.23; 705/14.39; 705/14.51; 705/14.67; 705/27
(58) Field of Classification Search ............... 705/14.1, 705/14.16, 14.23, 14.39, 14.51, 14.67, 27
See application file for complete search history.

(56) References Cited

U.S. PATENT DOCUMENTS

| | | | | |
|---|---|---|---|---|
| 4,842,278 A | 6/1989 | Markowicz | ............ | 273/138 A |
| 5,368,129 A | 11/1994 | Von Kohorn | ................ | 186/52 |
| 5,537,314 A * | 7/1996 | Kanter | .................... | 705/14.13 |
| 5,592,375 A | 1/1997 | Salmon et al. | .............. | 395/207 |
| 5,794,207 A | 8/1998 | Walker et al. | ................. | 705/23 |
| 5,812,769 A | 9/1998 | Graber et al. | .......... | 395/200.12 |
| 5,819,092 A | 10/1998 | Ferguson et al. | ............ | 395/701 |
| 5,819,285 A | 10/1998 | Damico et al. | ............. | 707/104 |
| 5,937,037 A | 8/1999 | Kamel et al. | ............. | 379/88.19 |
| 5,950,173 A | 9/1999 | Perkowski | ................... | 705/26 |
| 5,991,411 A | 11/1999 | Kaufman et al. | ............. | 380/24 |
| 5,991,740 A | 11/1999 | Messer | ........................ | 705/27 |
| 5,995,939 A | 11/1999 | Berman et al. | ................. | 705/3 |
| 5,999,929 A | 12/1999 | Goodman | ...................... | 707/7 |

(Continued)

OTHER PUBLICATIONS

Dialog file 636 #03631982 titled "Argos Business Solutions: customer referral scheme encourages sales of mobile phones" M1 Presswire, PNA, Jul. 8, 1997.*

(Continued)

*Primary Examiner*—Raquel Alvarez
(74) *Attorney, Agent, or Firm*—Haverstock & Owens LLP

(57) ABSTRACT

A marketing method comprising a Provider offering a potential reward to a first party in exchange for promotional assistance of forwarding a first e-mail message to a second party comprising a personalized referral for the marketable entity, a first set of data comprising a first serial number and a first URL link. A first Web site corresponding to the first URL link is created which provides information on the referenced marketable entity and an offer to transact. The first set of data in the first e-mail message is correlated to a first set of database data within a digital database controlled by the Provider. The first e-mail message is forwarded from the Provider to the first party. The first e-mail message is forwarded from the first party directly to the second party without giving any identifying information about the second party to the Provider.

23 Claims, 15 Drawing Sheets

U.S. PATENT DOCUMENTS

| | | | |
|---|---|---|---|
| 6,014,634 A | 1/2000 | Scroggie et al. | 705/14 |
| 6,016,504 A | 1/2000 | Arnold et al. | 709/200 |
| 6,029,141 A | 2/2000 | Bezos et al. | 705/27 |
| 6,032,184 A | 2/2000 | Cogger et al. | 709/223 |
| 6,041,311 A | 3/2000 | Chislenko et al. | 705/27 |
| 6,049,777 A | 4/2000 | Sheena et al. | 705/10 |
| 6,055,573 A | 4/2000 | Gardenswartz et al. | 709/224 |
| 6,061,660 A | 5/2000 | Eggleston et al. | 705/14 |
| 6,198,977 B1 | 3/2001 | Bixler et al. | 700/83 |
| 6,282,522 B1 | 8/2001 | Davis et al. | 705/41 |
| 6,289,318 B1 | 9/2001 | Barber | 705/14 |
| 6,295,482 B1 | 9/2001 | Tognazzini | 700/233 |
| 6,327,572 B1 | 12/2001 | Morton et al. | 705/10 |
| 6,330,550 B1 | 12/2001 | Brisebois et al. | 705/75 |
| 6,405,175 B1 | 6/2002 | Ng | 705/14 |
| 6,449,634 B1 | 9/2002 | Capiel | 709/206 |
| 6,598,026 B1 * | 7/2003 | Ojha et al. | 705/26 |
| 6,615,184 B1 | 9/2003 | Hicks | 705/26 |
| 2001/0001856 A1 | 5/2001 | Gould et al. | 705/39 |
| 2001/0020231 A1 | 9/2001 | Perri, III et al. | 705/14 |
| 2001/0032115 A1 | 10/2001 | Goldstein | 705/10 |
| 2001/0053980 A1 | 12/2001 | Suliman, Jr. et al. | 705/1 |
| 2002/0198054 A1 | 12/2002 | Auxier et al. | 463/42 |
| 2005/0075935 A1 | 4/2005 | Walker et al. | 705/16 |

OTHER PUBLICATIONS

Web archive, "recommend.it.com" Jun. 10, 1988, pp. 1 through 4.
r-coupon brochure, "Generating and Harvesting Goodwill by Enhancing Word-of-Mouth Marketing", pp. 1-3.
r-coupon brochure, "Harvesting Goodwill through Relationship Referral Marketing", pp. 1-5.

* cited by examiner

402

Dear John

I recently perchased an xyz sports utility vehicle .
I thought about the last time I visited you and we went fishing, when your camper had difficulty with the terrain. I am extremely pleased with the model I purchased, and thought you should take a look at it. Through the attached coupon with my referral you can get a substantial discount.

Enjoy!

Mike

404

*r-coupon*
harvesting goodwill

406

Vender Icon or Trademark

Click here for information about the rewards program.

Click here for more information about the xyz sports ultility vehicle and the cash rebate available to you through the rewards coupon program.

*Fig. 4*

REFERRAL REWARD DISTRIBUTION AUTO INDUSTRY EXAMPLE

| Situation Description | Numbers of Individuals receiving referral rewards | Original Referrer | Last Referrer | Intermediate Referrer |
|---|---|---|---|---|
| Originator directly to buyer | 1 | $300 | -NA- | -NA- |
| Last referrer, no intermediate referrers | 2 | $100 | $200 | -NA- |
| One intermediate referrer | 3 | $100 | $200 | $200 |
| Two intermediate referrers | 4 | $100 | $200 | $100 |
| Four intermediate referrers | 6 | $100 | $200 | $50 |

*Fig. 10*

| n= | AA | BB | CC | DD | EE |
|----|------|------|------|------|------|
| 1  | $100 |      |      |      |      |
| 2  | $60  | $40  |      |      |      |
| 3  | $50  | $20  | $30  |      |      |
| 4  | $47  | $13  | $13  | $27  |      |
| 5  | $45  | $10  | $10  | $10  | $25  |

*Fig. 15*

METHODS OF ANTI-SPAM MARKETING THROUGH PERSONALIZED REFERRALS AND REWARDS

RELATED APPLICATIONS

This application claims priority under 35 U.S.C. §120 as a continuation-in-part of the co-pending U.S. patent application Ser. No. 09/635,994, filed Aug. 9, 2000, and entitled "WEB BASED REFERRALS WITH REWARD INCENTIVE". The co-pending and co-owned U.S. patent application Ser. No. 09/635,994, filed Aug. 9, 2000, and entitled "WEB BASED REFERRALS WITH REWARD INCENTIVE" is also hereby incorporated by reference in its entirety.

This application also claims priority under 35 U.S.C. §119(e) of the co-pending provisional application Ser. No. 60/147,964 filed on Aug. 9, 1999 and entitled "Automatic Referral System Using Electronic Messaging and E-Commerce Capabilities." The Provisional application Ser. No. 60/147,964 filed on Aug. 9, 1999 and entitled "Automatic Referral System Using Electronic Messaging and E-Commerce Capabilities" is also hereby incorporated by reference.

FIELD OF THE INVENTION

The present invention relates to the field of Anti-Spam Marketing Methods. More particularly, the present invention relates to methods of anti-spam marketing through personalized referrals and rewards via the Internet.

BACKGROUND OF THE INVENTION

Effective marketing is an essential element in the success of virtually any enterprise in today's competitive marketplace. Marketing methods have shown themselves to be as varied as the human imagination. Product focused marketing has endeavored to advance a product through advertising the value, utility or attractiveness of a specific product, focusing on a through advertising the value, utility or attractiveness of a specific product, focusing on a product itself. Signs and trademarks at a place of business identify the business and its various products to passing consumers. Billboards, radio and TV commercials, and slick full-page ads in national magazines have proven an effective means for advancing the consumer recognition of a good or service. Quantifiable product claims, such as the cubic footage available in a sport utility vehicle or the job placement success for graduates of a university can help consumers select a good or service appropriate to their needs. There are, however, numerous drawbacks to product focused marketing. The first and perhaps most obvious question is a meaningful cost benefit analysis of a particular marketing program. A company that invests in various mediums of advertising may see its sales increase. It is often hard, however, to isolate the one factor or several factors which most effectively lead to increased sales. Statistical models may provide a likelihood of which advertisements are most effective, but in the final analysis, it is generally difficult if not impossible to accurately determine the actual value of a particular ad or other marketing program. Moreover, product focused marketing especially requires a large capital outlay before the beneficial results of product sales are ever realized.

A second problem with product focused marketing is the limited capacity for addressing consumer needs and concerns. With many products, such as an automobile, there are dozens, perhaps hundreds of possible selling points. Every consumer has their own set of priorities, objectives, desires and concerns. In the purchase of an automobile, for example, consumer concerns may range from price, financing schemes available, horse-power, suspension and handling, ABS breaks, the availability of convertible models or sun-roofs, compact disk players, leather interiors, mag-wheels, available colors, air bags, side impact tests and consumer safety ratings, resale value, service and reliability, and even the purchase experience itself, and whether it was an unpleasant experience such as a 'hard sell.' A TV commercial may try to anticipate as many consumer concerns as possible, but ultimately, it is impossible to know the needs of every consumer, and equally impossible to address every possible consumer concern in a single commercial. Specialized advertising can oftentimes single out specific demographic or psychographic groups, but some consumer concerns, such as persons averse to a "hard sell," may be so ubiquitously disbursed throughout the public at large that it becomes virtually impossible to isolate them with low cost targeted advertising as exits in the prior art. Because of this, product focused marketing typically fails to address the interests or concerns of every consumer.

A third problem with product focused marketing is the question of impartiality. No car dealer has ever marketed itself as having "pushy sales people." Puffery, and product claims advanced by one marketing a good or service are therefore received with a measure of diffidence by the average consumer.

Personality focused marketing has been used to bridge some of the gaps inherent in product focused marketing. In personality focused marketing, testimonials or endorsements are offered by a carefully selected personality. These endorsements are calculated to associate a good or service with a personality who is famous, believable, successful, wealthy or physically attractive. Many of the same problems that attend product focused marketing however are inherent in personality focused marketing. Not only is there the production cost of the TV ad or magazine shoot, there is the added cost of securing the name or appearance of the endorsing party. A famous athlete may be paid ten million dollars a year to promote an athletic shoe. Add to this the cost of production and distribution of posters, radio or TV ads, and the cost benefit question looms larger than ever. As with product focused marketing, the capital outlay precedes any sales return or benefits to the company. Moreover, it may be difficult or impossible to distinguished the value of the personality from the value of the ad or marketing venture itself.

Questions of impartiality may be satisfied in part when endorsement is secured by a personality known for "credibility." When a sports figure is being paid ten million dollars a year to promote a product, however, charisma may be high, but the perception of impartiality may not be as great.

Direct marketing such as telemarketing can, by asking a series of questions in a survey, identify the concerns of an individual consumer far more accurately than product or personality focused marketing. Nevertheless, telemarketing has its own distinctive drawbacks, not the least of which is that it is considered particularly annoying by a great many consumers. First, the timing is not controlled by the consumer. Rather than sitting down to open mail or look at e-mail in their spare time, a consumer is apt to have their dinner or favorite movie interrupted by a telemarketer. Moreover, in telemarketing situations, a consumer does not fully control his or her evaluation of the good or service. Unlike a piece of conventional (postal) mail which the consumer can easily fold up and throw away, or a TV commercial they can easily turn off or walk away from, not everyone has the same comfort level abruptly terminating an unwanted conversation with a telemarketer. Even for those who have no difficulty hanging up on an unwanted telemarketer, the initial interruption can be enough to be annoying. In response to the proliferation and aggression of telemarketing, many consumers have become resistant and even hostile to this form of marketing, erecting elaborate telephone screening processes at home to avoid contact with telemarketers.

Multi-level marketing, with a common emphasis on recruiting one's friends and acquaintances, was able to address many of the weaknesses inherent in traditional marketing schemes. A person typically has a greater ability to address relevant features of a product when they know the person to whom they are presenting the product. In its earliest days, multilevel marketing grew like rapidly, making a great deal of money for many entrepreneurs. And, at least initially, there was a high level of trust and credibility among friends. As multi-level marketing programs proliferated, however, an increasing percent of the population became exposed to, and recruited by someone in multi-level marketing. The force of such marketing has proven uncomfortable in many instances both for the recruiter and the potential buyer. Many have felt "ambushed," attending a function on invitation only to learn after arriving that they were being recruited for a sales force in an MLM company. Even long trusted friends are often viewed as suspect when they invite their "friends" to an "opportunity meeting." Accordingly, the growth in multi-level marketing has been met with a growing level of resistance. MLM's experience various other disadvantages as well. By simple rules of mathematics, only a small percent of the participants can have hundreds or thousands of people under them, a numerical advantage necessary to produce the phenomenal earnings which are so often used to lure people into MLM's. As a consequence, the rewards are not distributed evenly among those promoting the good or service. The revenue disproportionately favors those who began on the "ground floor." Also, as a result of sales commissions being paid to extensive "downlines," MLM products are often far more expensive than equivalent products sold through traditional consumer outlets. Finally, new participants are typically required to make a purchase as an up-front cost to get the benefit of participating in sales revenue.

Incentives, such as rewards and discounts, have been a common form of marketing for many years. Direct mailings to consumers often comprise coupons offering a discount for purchasers of a particular good or service. Trading stamps allow consumers to accumulate a theoretical value for collection of purchases. The stamps could eventually be redeemed some good or service. Factory rebates return a portion of the sales cost to a purchaser, effectively lowering the price of the good or service sold. Each of these marketing schemes, however, has its own drawbacks. Many people can remember growing up in homes where an entire desktop or table top devoted to the collection of trading stamps, or the selection and processing of discount coupons. For many consumers, the trouble is not worth the effort. Moreover, reward incentives often fail to address other marketing concerns, such as positioning quality attributes (reliability, fit for use, "fit-and-finish," etc.), or identification of a product with a trusted endorser.

The explosion of the Internet and the use of e-mail and the Web on the Internet has created a whole new frontier for advertising and marketing. Again, however, many limitations inhere in both of these marketing forums. Web advertising ranges from the highly passive to the highly aggressive. Relying on consumers to locate a good or service through a search engine, or allowing a consumer to stumble onto one's good or service by "surfing the net" is an extremely passive form of advertising, relying on the initiative of the consumer himself.

On the other hand, some forms of web advertisement are highly aggressive. Many web-surfing consumers have had the experience of clicking on an Internet advertisement or hypertext to further examine a good or service, only to find themselves trapped in a labyrinthine maze which pops them into a new window every time they try to back out. Much like the frustration engendered by pushy telemarketers, the consumer loses his or her ability to simply say "no" when their computer operations have been commandeered by an overly aggressive, renegade website. Such cyber-manipulation does little too engender confidence within the consuming public, and may well be counter productive to the marketing of most goods and services. E-mail has become a wasteland of "spam." Some consumers are so inundated with unwanted spam that they are forced to change their e-mail address at regular intervals just to eliminate the amount of incoming spam. The invasion is deemed a personal one by many, and creates a wariness among many consumers with respect to giving away one's e-mail address or clicking on certain web sites. For those who do not elect to change their e-mail address, the alternative is often to avoid the proliferation of burdensome spam by deleting incoming mail when the "from-field" indicates that it is not from a friend.

Another alternative to avoid unwanted spam is to implement a junk e-mail filter to one's e-mail account, but oftentimes such a filter does not eliminate all spam from the account. Spammers have become very adept in altering the titles and body text of their e-mails to look like personal e-mails, to circumvent junk e-mail filters. As a result, even with junk e-mail filters in place, spammers can still spam unsuspecting e-mail account holders with unwanted advertisements and sales proposals. This constant stream of spam has led many e-mail account holders to activate an e-mail address database of friends and families with their junk e-mail filter, so that the junk e-mail filter will automatically delete all other e-mails that do not originate from a recognized e-mail address listed in the e-mail account holder's database.

There exists therefore a need for a method of anti-spam marketing that allows for personalized referrals of specific products through e-mail. There also exists a need for a method of anti-spam marketing that instills confidence to the Provider, the referrer and the referee. The Provider needs to feel confident that the marketing method utilized will reach the intended target audience. The referee needs to feel confident that if he or she refers friends and family members to the product, the referral will not result in spam. The referee needs to feel confident that his or her e-mail account will not be flooded with spam as a result of the referral made by the referee.

There also exists a need for a method of marketing goods and services that can highlight selective product benefits and qualities most likely to be a concern to a particular individual's tastes among a diverse clientele. There further exists a need for a method of marketing goods and services that lends itself to a cost-benefit analysis and the ability to precisely identify and control the marketing cost per unit sale. There is a need for a method of marketing that allows the consumer to determine the time at which he or she will evaluate a marketing solicitation, and further allow them to control the length of time they will spend evaluating the solicitation. A further need is for a method of marketing goods and services that provides the personal endorsement of a trusted or respected party.

There further exists a need for a method of marketing goods and services that provides a reward incentive for a friend or associate recommending the good or service. A further need is for a method of marketing goods or services wherein the reward incentive offered to a recommending party does not appear as a conflict of interest to the prospective client, thereby diminishing the credibility of a person or friend recommending a good or service. Yet another need is for a method of marketing goods and services that does not leave a consumer feeling ambushed or pressured by a friend or relative recommending the good or service. Another need is for a method of marketing goods and services wherein the reward incentives are not disproportionately accumulated among a select few persons. There is a need for a method of marketing that does not create "clutter" or require undue administrative labors in cutting, pasting, sifting, filtering, organizing or managing a program of reward incentives.

There is another need for a method of marketing that can take advantage of the advances in internet and e-mail technology. There is further a need for a method of marketing a good or service which does not passively wait for a consumer to stumble upon the good or service by "surfing the net" or using search engines, but actively advances the marketing interests of a good or service. There exists a need for a method of marketing that does not commandeer the computer operation of a potential client's computer by an interactive and overly-aggressive website. There is a further need for a method of marketing that protects a consumer's confidentiality and privacy, and further protects a consumer from having their name added to mailing lists of aggressive junk mailers or spammers. There further exists a need for a method of marketing wherein the greatest portion of marketing costs are not incurred until after a product is sold.

BRIEF DESCRIPTION OF THE INVENTION

The present invention is for a method of anti-spam marketing through personalized referrals and rewards using the World Wide Web. The method is intended for a Provider who wishes to provide current and potential customers with confidence that their personal e-mail addresses will not be attacked with endless spamming as a result of the Provider's marketing. Furthermore, the method allows for a Provider to target a specific audience for marketing purposes. Once the specific audience is identified, then the Provider offers rewards to those referrers who wish to personalize an e-mail referral of the Provider's good or service addressed to referees. All of this is done without the Provider knowing the referees' e-mail addresses at first. Thus, both the referrer and the referee can gain confidence that the referee's e-mail address has not be disclosed to the Provider for spamming purposes. Rather, the referrer and the referee can gain confidence that the referral is a credible recommendation of the Provider's good or service. Thus, one aspect of the anti-spam marketing method of the present invention allows for a referrer to send personalized referral e-mails from the referrer's e-mail account straight to the referee's e-mail account.

The method of marketing goods and services for a method of marketing goods and services can highlight selective product benefits and qualities most likely to be of interest to a particular individual's tastes among a diverse clientele based upon a referral. The method of marketing goods and services also lends itself to a cost-benefit analysis and the ability to precisely identify and control the marketing cost per unit sale. The method of marketing allows the consumer to determine the time at which he or she will evaluate a marketing solicitation, and further allow them to control the length of time they will spend evaluating the solicitation. The method of marketing goods and services relies upon a personal endorsement of a trusted or respected party. A reward incentive is provided to a friend or acquaintance recommending the good or service. The method of marketing goods or services minimizes the appearance of conflict of interest of a recommendation coming from a friend or associate, which might otherwise serve to diminish the credibility of a person or friend recommending a good or service. The method of marketing goods and services does not leave a potential buyer feeling ambushed or pressured by a friend or relative recommending the good or service. The present invention further provides reward incentives that are not disproportionately accumulated among a select few persons.

The present invention further describes a method of marketing that does not create clutter or require undue administrative labors in cutting, pasting, sifting, filtering, organizing or managing a program of reward incentives by the party earning the rewards. The method of marketing can take advantage of the advances in internet and e-mail technology. Marketing a good or service according to the present invention does not passively wait for a consumer to stumble upon the good or service by "surfing the net" or using search engines, but actively advances the marketing interests of a good or service. Further, the method of marketing does not commandeer the computer operation of a potential client's computer through overly-aggressive web technology. The present invention is for a method of marketing that protects a consumer's confidentiality and privacy, and further protects a consumer from having their name added to mailing lists of aggressive junk mailers or spammers. The present invention further describes a method of marketing which does not incur any cost to the seller until a product or service is sold.

According to one embodiment of the present invention, a method of marketing a marketable entity selected from a group consisting of goods and services comprises the steps of creating a digital data base controlled by a Provider and offering a potential reward to a first party in exchange for promotional assistance of the first party. The promotional assistance comprises assistance in the forwarding of a first e-mail message to a second party, which includes a referral for the marketable entity and a first token. A first token serial number correlates the first token to a group of related data within the Provider's data base. A first URL link is embedded in the message. Although not limited to any one expression of data, the token serial number will advantageously be comprised of data relating to the address of the first URL link, an e-mail address of a valid token holder, a transaction identifier, or a combination of these three data values. The first token and referral data are advantageously correlated within the data base to a transaction identifier, which is not necessarily the product of a transaction. The embodiments of the invention according to the following references can be thought of as a virtual two-ended coupon, whereby a referrer sends or forwards a message containing a personal message intended for the recipient, a brief marketing message describing the basics of the referral program (pre-written by the Provider) and a link to a Web site and/or a token. The two-endedness is comprised of a first component that provides a discount to the receiving party upon purchase and a second component that provides a reward to the forwarding party for having made a referral by sending or forwarding the promotional message to a friend, family member or associate.

According to a Wholly Data Base embodiment of the present invention, the step of forwarding the first e-mail message to the second party is accomplished according to the following steps: the first party forwards an e-mail address of the second party (or a plurality of second parties) to the Provider, preferably through the use of an e-mail field generated using the browser interface while accessing the provider Web site. The Provider updates its data base; and the Provider initiates the act of e-mailing to the second party. To minimize the likelihood of the message being deleted upon receipt by the recipient, the data base will advantageously write the name of the first party in the "from" field of the e-mail.

According to a Token Implementation embodiment of the present invention, prior to the step of forwarding the first e-mail message to the second party, the first party visits the Provider's Web site and updates or replaces the token. The updating of the token may consist of updating data stored within the traveling token itself, updating data within a portion of the data base to which the token is referenced, or updating data in both the token and the data base.

According to an Instant Forwarding With Tracking embodiment of the present invention, the first e-mail message to the second party comprises the steps of forwarding the first e-mail message from the first party to the second party; and forwarding an authenticating e-mail message from the first party to the Provider, the authenticating message comprising the first token serial number with an identifier of the second party, the authenticating e-mail message thereby authenticating an offer in the first e-mail message for the second party to transact for the marketable entity. The identifier of the second party is added to the data base. The identifier of the second party is advantageously includes the e-mail address of the second party.

According to one embodiment of the present invention, the first URL link is accessible through an icon or URL link visible in the message. The transaction for the marketable entity is advantageously performed online through the Provider's Web site, though non-interne transactions are also envisioned. When a referral results in a transaction, select parties from the chain of referral are rewarded. The reward may variously be cash, goods or services, or credits which can be accumulated and traded for or applied to the purchase of goods or services or donated to other entities such as charities. Rewards are recorded in a credit account within the data base.

According to one embodiment of the present invention, if the second party elects not to transact for the good or service, the second party is invited to forward the offer to a third party. The second party is offered a potential reward for forwarding if a transaction ultimately results. According to one embodiment of the present invention, the first party may be granted a privilege of forwarding a greater number of messages than the second party.

Data within the data base is advantageously used to impede spamming, counterfeiting, altering, or hacking of tokens as well as unauthorized access to URL sites. A reward limiting algorithm is advantageously incorporated within the data base to limit the aggregate rewards that can be collected on any single transaction. According to one embodiment of the present invention, different referring parties are granted different reward incentives, with the greater rewards advantageously being awarded to the initial referring party and the final referring party immediately prior to the transaction and lesser rewards inuring to intermediate referrers.

According to one embodiment of the present invention, the data base is secured by at least one of a variety of means, including the issuing of a unique access code to each vendor whose goods or services are represented within the data base, thereby granting vendors limited access to the data base. According to one embodiment, the Provider will promulgate a company wide policy prohibiting sale or exchange of the database to other companies; and will actively enforce that policy.

According to another embodiment, the method of marketing includes a rewards distribution method where the total amount of reward offered by the Provider remains constant by a certain algorithm that allows the total amount of reward to be split by the original referrer, the person referring the purchaser, and all intermediate referrers. The total number of referrers are tracked by a tracking system implemented by the Provider.

These and other advantages will become apparent to those of ordinary skill in the art after having read the following detailed description of the preferred embodiments which are illustrated in the various drawings and figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 4 is a sample of an e-mail referral letter as envisioned according to one embodiment of the current invention.

FIG. 10 is a table showing the calculation of rewards for referral chains up to four intermediate referring parties according to the weighted reward embodiment.

FIG. 15 is a table showing the calculation of rewards according to the constant rewards embodiment.

DETAILED DESCRIPTION OF THE PREFERRED EMBODIMENT

Figure 1:
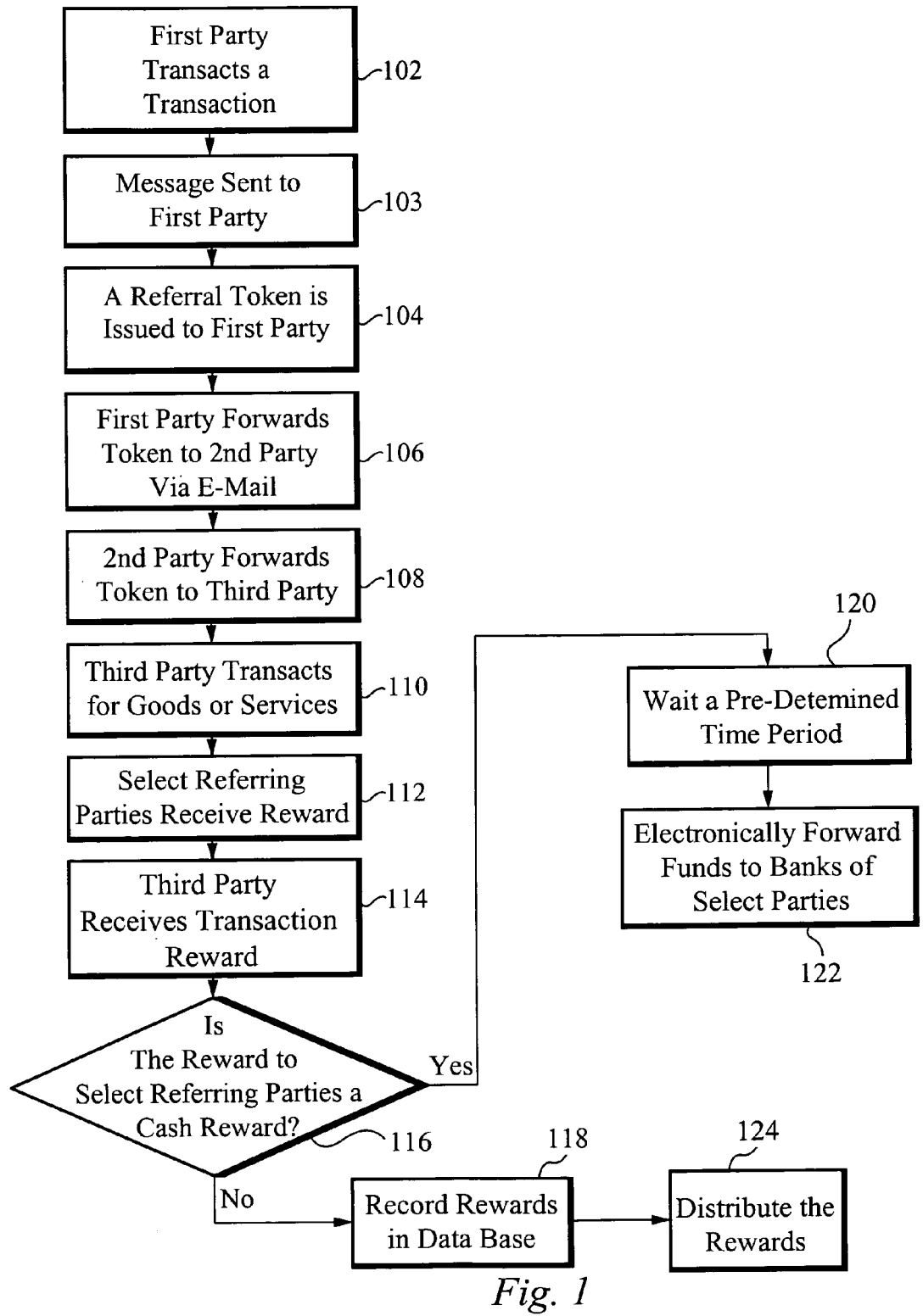
FIG. 1 is a flow chart of a referral rewards program.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the present invention. However, it will be apparent to one of ordinary skill in the prior art that the present invention may be practiced without these specific details. In other instances, well-known methods and procedures, components and processes haven not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the arts. A procedure, logic block, process, etc., is here, and generally, conceived to be a self-consistent sequence of steps or instructions leading to a desired result. These steps are those requiring physical manipulations of physical quantities. Although reference is made herein to the URL sites, domain names, e-mail addresses, the Internet, Web sites, the Web and the World Wide Web, these terms are intended to represent the widest application of desktop to desktop communication system through computer type devices interfacing by means of any LAN, PSTN, TCP/IP, PPP, cable modem, ISDN, DSL, electrical, fiber optics, radio, satellite, telephony or other remote communication means, even if such communication channels are "closed networks" inaccessible or otherwise distinct from other portions of the world wide web. The term "e-mail" as used herein may refer to any automated delivery system of mail or messages through electronic, satellite, radio, infrared or fiber optical medium. The term "computer" is traditionally used as comprising a digital machine having a user interface device such as speakers or a monitor, user input such as a microphone, keyboard or mouse, a central processing unit, and a digital storage. When used with respect to the present invention, however, the lack of some of these elements or the presence of additional elements should not be construed as to change the meaning if a function described is traditionally or commonly performed on a computer. For example, a computer lacking a keyboard, monitor and mouse is capable of communicating over a network and accessing data from a data base. The term "computer" is therefore intended in the broadest sense, including file servers, routers and other digital devices, whether or not data therein is immediately accessible to users. The term "URL site" as used herein is intended to refer to any data site accessible through the Web, Internet, or net communications, and is intended to include not only a single original URL site visible on a monitor, but those URL sites and visual displays accessible directly or indirectly through links from the original URL site. The processes, mechanism, procedures also apply to any appropriate communications types or systems, or a mix of communications types, such as telephony (voice, facsimile, data) printer (paper, plastic, etc.) voice over IP, voice recognition, non-electronic mail, etc.

FIG. 1 discloses a basic flow chart comprising many features of the present invention. In the step 102, the first party purchases a good or service. According to the step 103, a message is sent to the first party telling them about the marketing program. Although e-mail is the preferred embodiment, the message may be sent through conventional mail, phone message, or some other means using an address locator known to the vendor. The first party then accesses the Web site through entering a designated web address. Although the preferred embodiment is an automatic link (Internet URL or telephony), it is envisioned that manual entry to a Web site may be made through key-in, voice command, or other user-guided means. According to the step 104, a descriptive message preferably comprising a first token is issued to the first party. The token is sent with a digitally transmissible message advantageously comprising a reward offer for referring parties and an offer of goods or services, and a description of an incentive for a party to purchase or transact for the goods or services, and a description of an incentive for a party to forward the token in recommendation of the good or service, and a URL link. According to the step 106, the first party forwards the token to the second party via e-mail. According to the step 108, if the second party declines to transact for the purchase of the good or service of the referral, the second party can instead forward the token to a third party via e-mail. In the step 110, the third party transacts for the good or service described by the message with the token, or described at a URL site. In the step 112, select parties involved in the forwarding of the token are rewarded for referring the good or service to another party. In the step 114, the third party which transacted for the good or service described by the token is rewarded. For reasons discusses in more detail below, according to the preferred embodiment, rewards for referrals will be "soft" rather than cash rewards. If a reward is non cash in the step 116, records of the "soft" rewards are stored in a data base according to the step 118. However, for those providers of goods and services who elect to offer "hard" cash incentives for referrals, the cash award will advantageously be electronically transferred from the data base to the designated bank account of the selected referring parties according to the step 122. Because of the possibility of returned goods, however, according to the step 120, referral rewards in the form of cash would initially be recorded in the Data Base, and not forwarded to the bank of the appropriate party until a predetermined time period has passed.

The reward to the transacting party need not be cash, but for most goods and services, it is envisioned that the transaction incentive will typically be a cash discount that occurs at the time of the transaction, including cash rebates secured at the time of transaction but which may incur a delay in the actual forwarding of a money rebate. According to the preferred embodiment, however, the incentive offered to the purchaser is distinct from, and of greater value than the incentives offered to the referring party. Of course the incentive structure could be different. For example, the incentives can be the same for both parties, or the referring party's incentive could be larger.

Although the preferred embodiment for the present invention is a web-based referral system, many transactions, such as automobile purchases, are not typically done "on line." Therefore, while the present invention is most easily implemented in conjunction with online purchases, it is envisioned that the r-coupon system will be equally compatible with transactions performed "off line," such as those conducted at an automobile dealership. In the case of transactions performed off-line, the referral system following the purchase can be initiated on-line after the transaction, in a manner identical to that of online purchases. The off-line redemption of a discount, rebate, or other incentive can be accomplished in a variety of ways, such as securing a personal identification number PIN from a URL site, or mailing in a proof of purchase receipt to the Provider. Because the process is most advantageously implemented through electronic e-mail with a data "token" which may be passed through multiple referrers, reference is made herein to a "token". A more detailed discussion of a token will be offered in conjunction with subsequent drawings. It is understood that the "parties" in the above chain of referral may include persons, corporations, companies, utilities, contractors, churches, foundations, trusts, labor unions, associations, and any other entity with the capacity of recommending or transacting for a good or service.

Although an initial transaction the step 102 is depicted in FIG. 1, alternative embodiments are envisioned wherein other steps are substituted for an initial transaction. There are, however, at least two benefits of requiring an initial transaction as the initial step of this process. The first advantage is the credibility associated with a purchase. A recommendation from an individual that actually made a purchase or transaction for a good or service is likely to carry more weight and credibility than one coming from someone who did not purchase good or service trying to encourage others to purchase the good or service. A second advantage to limiting the referral system to purchasers only is to avoid the debasing of the referral system through spamming. If the capacity to disburse referrals were given freely to non-purchasers, the referral system could be inundated by professional referrers who spend their days accessing web sites and spamming out as many referrals as possible to e-mail address lists. Such spamming would both erode the good will associated with a personal referral, and debase the value of each referral. Nevertheless, the present invention envisions a controlled use of non-transaction based referrals. For example, if an avid tri-athlete had not purchased her bicycle from the local bike shop, but, in coming to know and respect the local shop owner, regularly directed clients toward the local bicycle shop, the owner would naturally want to award non-transaction referral tokens to the tri-athlete, the term "non-transaction" simply distinguishing the manner in which the tokens were obtained. Non-transaction referrals would advantageously be tracked within the data base in the same manner as transaction-referrals, even being assigned a "transaction identifier" which would advantageously include a flag or data distinguishing the data there-under as relating to a non-transaction referral.

According to the preferred embodiment therefore, individual sellers of goods and services would have a certain amount of discretion in the awarding of tokens or referral rights to non-transacting entities, and the circumstances under which non-transacting referral tokens are granted. However, it is possible that a seller imprudently granting excessive rights for token forwarding might not only debase the token value for their own store, but reflect on the token referral service as a whole. Therefore, to prevent the debasing of the referral system, according to the preferred embodiment, the referral system Provider will establish policy guidelines for metering token distribution, both to transacting and non-transacting parties, including means for monitoring and controlling the issuance of referrals. This would preferably include the allocation of additional tokens for referring parties which had produced transactions a satisfactory number of transactions through their previous referrals.

As discussed briefly in conjunction with the step 112 of FIG. 1, as a result of a transaction, select parties from among the chain of referral are rewarded. If left uncontrolled, however, a chain of referral rewards can result in sustained losses, as illustrated through the following example.

To better understand this problem, consider the following example. The transacting party purchases a pair of snow skis, poles, a down jacket, goggles and associated ski equipment. The total cost is $1,000 and the profit to the seller is $350.00. As a reward incentive, the manufacturer of ski goods offers a one-day lift ticket at a certain ski resort for purchases of at least a thousand dollars. The cost of the lift ticket would normally be $50.00 per day, but the ski manufacturer negotiated a price of $25.00 for people coming on referral. In a "flat" referral system, every party in a chain of referral would receive a predetermined reward. According to this reward scenario, if four people are incorporated in the chain of referral, four people would receive a one-day ski-lift pass. Simple math reveals a potential problem with a flat referral system. If a chain of referral were fourteen persons long before generating a transaction of $1,000, the cost of referrals equals the $350 net profit realized through the sale. The gross profit is zero. At fifteen consecutive referrals prior to a transaction, the manufacturer is losing money. Because long referral chains and short referrals chains may average out to a predictable length, for example, a particular marketer of goods and services may be willing to accept a market average of short and long chains of referrals, and adopt a flat rewards plan in spite of the fact that some chain referrals result in a loss. Even with an "averaging" which made a flat referral system acceptable to one offering a good or service, there are still drawbacks to a flat referral scheme. At the beginning of the r-coupon program, the costs may average out favorably. However, as the popularity of the r-coupon system program grows, a growing understanding of how the program works may become a temptation for some people to deliberately manipulate the system. According to the above example, if a husband and wife both intended to upgrade their ski equipment, and they were members of a group of avid skiers who know each other, they could agree to pass on a referral between each other through friends from a local ski club in order to secure referral benefits for every one in the group. Therefore, even if initially acceptable, a flat referral system may grow to be unacceptable over time as a growing consumer sophistication learns how to take adverse advantage of the system. In the preferred embodiment therefore, a data base is used keep track of a broad range of statistical data for business analysis, including the average aggregate referral cost per transaction, the number of referrals per transaction, and weekly, monthly or yearly trends for these figures. Such a data base would give a seller of goods and services not only a way to track costs associated with the r-coupon referral system, but a means for controlling costs by varying the referral awards given out in response to varying market conditions.

Figure 2:
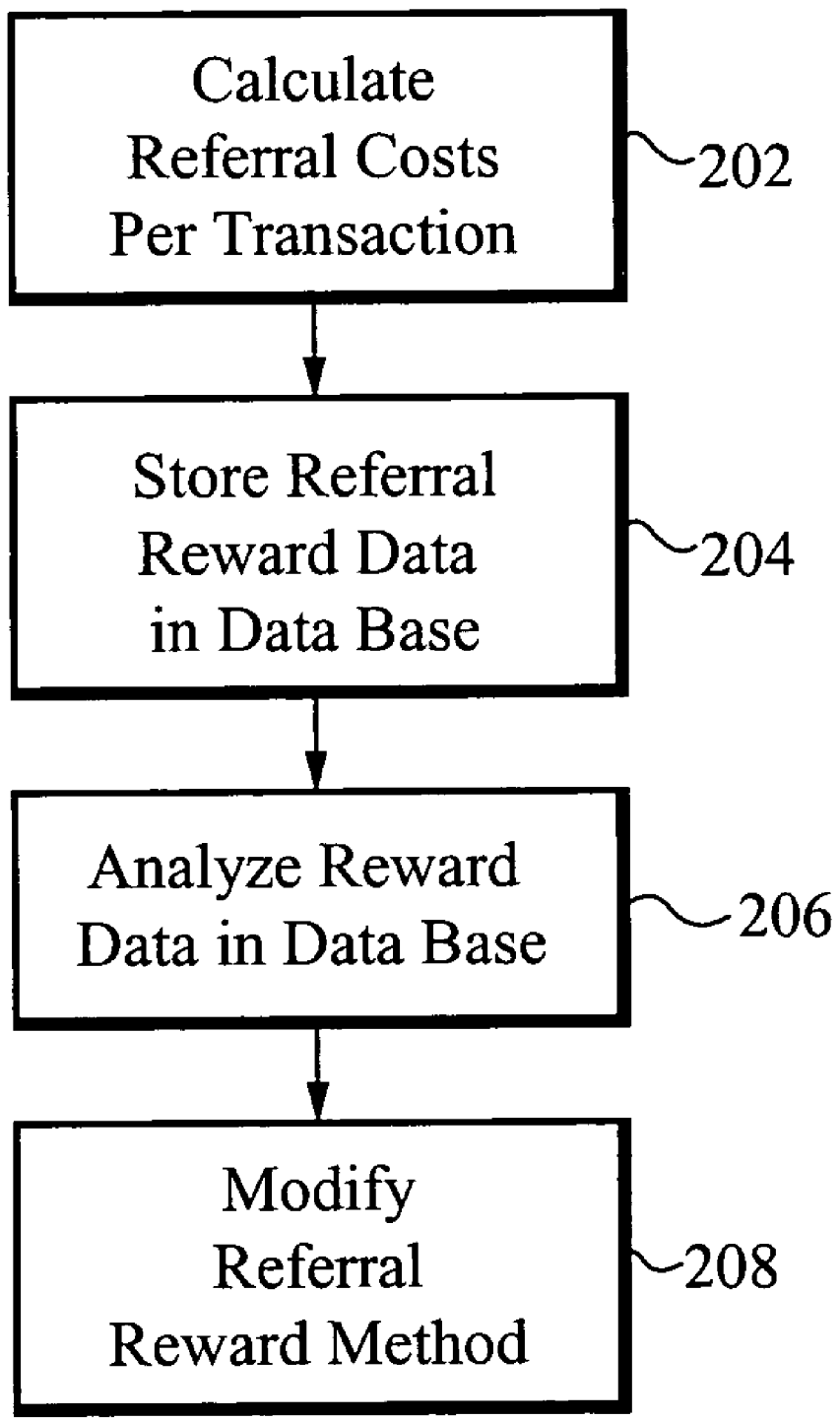
FIG. 2 is a flow chart of a cost control and review method of a referral rewards program.

FIG. 2 discloses a process for managing rewards programs. In the step 202 the aggregate cost of referrals for a single transaction is calculated. In the step 204, referral reward data is stored in the data base. In the step 206 the referral reward data is analyzed. This may include, but is not limited to such factors as referral costs, trends and the rate of change in referral costs, referral chain lengths, the rate of change in referral chain lengths, statistical aberrations in referral chain lengths, and comparative success of different reward programs for similar products. In the step 208, the referral reward system is modified to create the most cost effective referral system. Although there is no one model for cost effectiveness, according to the preferred embodiment, the most cost effective system will take into consideration the aggregate referral costs per transaction, the net profit per referral generated transaction, the effect on market share, long term customer loyalty, or any combination of these factors.

There exists a wide variety of options for controlling or limiting the maximum aggregate referral reward per transaction. These include, but are not limited to a weighted rewards method, progressive rewards method, a maximum-chain-length method, a coupon shelf-life method, and any combination of two or more of these methods. By limiting rewards to a maximum aggregate sum, a seller of a good or service can avoid a situation wherein a series of cascading referrals exceeds the profit being made on the eventual transaction.

In the weighted reward embodiment, rewards may be distributed unevenly within a chain of referrals. Although FIG. 1 shows no intermediate referrers between the initial referrer and the final referrer, the figure could easily include multiple intermediate referrers between the initial and the final referring party. According to this example, any party in the chain of referral may receive a greater, lesser, or identical reward than any other party, including a variation wherein selective parties receive no referral reward at all. According to the preferred embodiment of the weighted method, the initial referring party and the final referring party would typically receive greater referral rewards than intermediate referral parties. The initial and final referring parties would receive a given amount regardless of the number of intermediate referrers, while the intermediate referrers would equally share a fixed amount. If there were only one referrer, they would receive the higher amount. FIG. 10 is a table showing one way in which rewards might be calculated for referral chains up to four intermediate referring parties according to the weighted-reward embodiment. An advantage of weighting rewards in this manner is that it encourages the initializing of the referral process, and encourages the consummation of the referral in a transaction. By reducing or eliminating the rewards paid to intermediary referrers, the weighted-reward method can be engineered to discourage manipulators from deliberately generating long referral chains calculated to maximize their rewards. If intermediate parties receive no reward, circuitous forwarding schemes would only work to the detriment of those who constructed such schemes.

In the progressive reward method, less than one hundred percent of the rewards would be awarded for chains below a certain length. For example, if one hundred credits were the maximum available number of reward credits for a referral resulting in the purchase of an automobile, a maximum of ten credits might be given to any one referring party. Under this hypothetical circumstance, a referral chain four parties long would only receive forty percent of the aggregate available reward for the resulting transaction. In this situation, a chain of referrals at least ten parties long would be awarded one hundred percent of the available referral credits. According to the progressive rewards scheme, once a referral chain reached a length wherein 100% of the credits were being awarded, one or more of the other award limiting methods described herein would necessarily have to be utilized. The total award could continue to be divided among an increasingly long chain of referrals, select referrers could be eliminated from the award, or the chain of referrals could be halted, as discussed below.

According to the maximum-chain-length method, a token would become inoperative after a preset number of referrals was exceeded. Although any of the above techniques can be used in conjunction with any other, the maximum chain length is particularly useful in a rewards limiting method for use in conjunction with a flat reward method. This can be illustrated by returning to the previous example of a ski-equipment distributor, and a hypothetical referral record in the data base. An analysis of the data base can reveal that the lengths of referral chains systematically taper off at an almost perfectly exponential rate, such that very few transactions are made after six referrals. However, it is noted that there are statistically aberrant chain lengths comprising fifteen or more referrals in a chain. The seller of ski equipment can conclude that referral tokens are seldom passed more than six times in good faith, and that the statistically aberrant referral chains are individuals seeking to manipulate and take advantage of the rewards program. The seller of ski equipment can then alter the rewards program to operate as a flat rewards scheme up to six referrals, after which length a reward token is rendered inoperative. By using the maximum-chain length method in conjunction with the flat referral method, a seller of goods or services can offer a very predictable referral reward to a series of referrers without being exposed to the risk of deliberate contrived referral chains. The flat referral reward is attractive for customer relations since the reward is stable, and does not give the appearance of evaporating in the very hand of one who has secured referral rewards. In addition to limiting referral costs, an advantage of the maximum-chain length method is that it enhances the purposes of the coupon referral system. The driving concept behind the referral coupon system is to harvest the good will of a consumer, existing and potential.

Returning to FIG. 1, if the second party does not redeem the good or service referenced in the token, but simply forwards the token to the third party, it is entirely possible that the third party does not even know the first transacting party. The good will associated with the transacting first party's recommendation therefore may be substantially diminished, particularly if the third party does not have a high level of trust and shared values with the second party. Moreover, the fact that the second party forwarding the rewards token rather than using it for his own purchase can further serve to diminish the value of the token. If the good will associated with a specific referral coupon is repeatedly diminished by lengthy chains of referral, it is possible that the value of the referral coupon itself could be diminished or debased. According to FIG. 2, the step 206 of analyzing data is advantageously performed by the referral coupon Provider to insure that the referral coupons are regarded as having genuine value, particularly the good will of another consumer. According to the step 208, the referral rewards system can be modified not only by the provider of a particular good or service, but by the referral coupon system itself, to maintain a high level of public confidence.

Another method of limiting the aggregate rewards generated by a single transaction is the coupon shelf-life method of limiting awards, wherein a coupon is given an expiration date. Although the date may cover any time period, it will preferably run from the date of the transaction that created the right to forward the coupon referral. Unlike the other methods disclosed herein, a coupon shelf-life does not guarantee that a certain aggregate rewards level will not be exceeded. It is theoretically possible for five hundred people to rapidly pass a referral token to one another in a matter of hours. However, the coupon shelf-life method has an advantage of being more "intuitive" to token recipients. Moreover, having an expiration date speeds the purchase-decision process and encourages referrers to take action in a timely manner. Expiration dates also provide marketing program administrative benefits for managing discounts and rewards, and bring closure to marketing programs. With the other reward-limiting methods, a token recipient may not know how many persons are in a referral chain, or may have to calculate his portion of the referral reward. Human psychology being what it is, the weighted rewards method has the potential of offending someone in the referral chain. For example, if a referral chain were five persons long, and a selective rewards method granted referral rewards to the first two and last two referrers in a referral chain, everyone but the third person in the chain of referral would be rewarded. There is a potential that such a reward system could kindle animosity against an r-coupon referral system on the part of the only party not to receive any referral reward.

Additionally, referring parties may wonder if there really were fifteen people in the referral chain, or if they are being cheated. Such concerns can be assuaged by storing the referral lineage in the coupon, but this has numerous disadvantages. To start with, it is possible only the final referrer would have an accurate list of how long the chain was, leaving previous participants wondering if the list really got that long. Secondly, including a referral lineage in a coupon runs the risk of infringing on privacy concerns. A distinct advantage of a coupon shelf-life displayed conspicuously on a coupon icon on an e-mail is that a start date and an expiration date is that it is a familiar concept to consumers. There is therefore a strong likelihood that consumers would regard such a system as fair, thereby minimizing consumer dissatisfaction with the r-coupon program. In conjunction with a coupon shelf-life embodiment, a flat payment scheme therefore serves as a further safeguard for consumer satisfaction. However, because the coupon shelf-life method does not in and of itself provide absolute protection against lengthy referral chains accomplished by a group of cooperating parties such as the ski-club illustrated earlier, the coupon shelf-life method can advantageously be used in conjunction with other reward limiting methods.

The methods disclosed above are not intended to exhaust the ways in which referral awards per transaction can be limited and controlled, but are simply illustrative of some of the options available for controlling or limiting the aggregate referral awards paid per transaction. It is also understood that the above methods for limiting rewards are not mutually exclusive, and a system could easily be envisioned which incorporates a combination of the above methods. It is envisioned, however, that fundamental goals of a transaction limiting method are: 1) to control referral costs, 2) to encourage referrers to refer to a buying party rather than to willingly become an intermediary party, and 3) to maintain the integrity of the referral system. According to the preferred embodiment of the present invention, individual merchants of goods and services will be given their choice of the means for limiting awards per transaction that best fits their company needs in response to market analysis. As noted in conjunction with the step 208, because public confidence in the genuine value of the coupon referral system is desired, the Provider of the referral system will have the power to limit reward control methods to those methods deemed to enhance consumer interest and public opinion in the coupon referral system.

The incentives offered to referring parties may either be in the form of cash, or in the form of "soft" non-monetary rewards in the form of goods and services. An advantage of a cash award is the ability to divide a dollar figure among multiple parties when reward limiting methods such as the distributed method divide the reward over a number of parties. For example, if a one-day lift pass to a ski resort were granted for a transaction, and the referral chain or lineage comprised six parties, it is highly impractical to grant a ski lift pass of ⅙th of a day to six different people. For some goods and services, such as an oil change or a clock radio, fractionalizing a reward becomes virtually impossible. A specific dollar amount referral reward may be more easily divided between multiple parties. However, because the present invention advantageously harvests the good will of trusted friends and acquaintances, there are drawbacks in a cash incentive for referrals. The referring party may appear to have a conflict of interest. That is, when a cash incentive is offered for referrals resulting in a transaction, a party contemplating a transaction may perceive the actions of the referrer as being motivated more from mercenary concerns than from goodwill. Although a soft reward may have an intrinsic value equal to or greater than a cash reward, it may be preferable to the extent that it may give less of an appearance of being the driving motive for the referral.

One way of resolving the dilemma of "soft incentives" is to offer divisible incentives such as a certain number of frequent flier miles or usable long distance minutes. Another way of dividing rewards between a chain of referring parties is the use of electronic script or quasi-monetary "credits" awarded for referrals. Much like trading stamps which were at one time very popular, and their electronic equivalents which are becoming popular, accumulating credits for referrals would give participants an option for how to use their reward. An oil change might not be a very valuable reward to someone driving an electric car. An accumulation of credits for each referral, however, would give the driver of an electric car a greater range of options that might be more useful and attractive.

Figure 3:
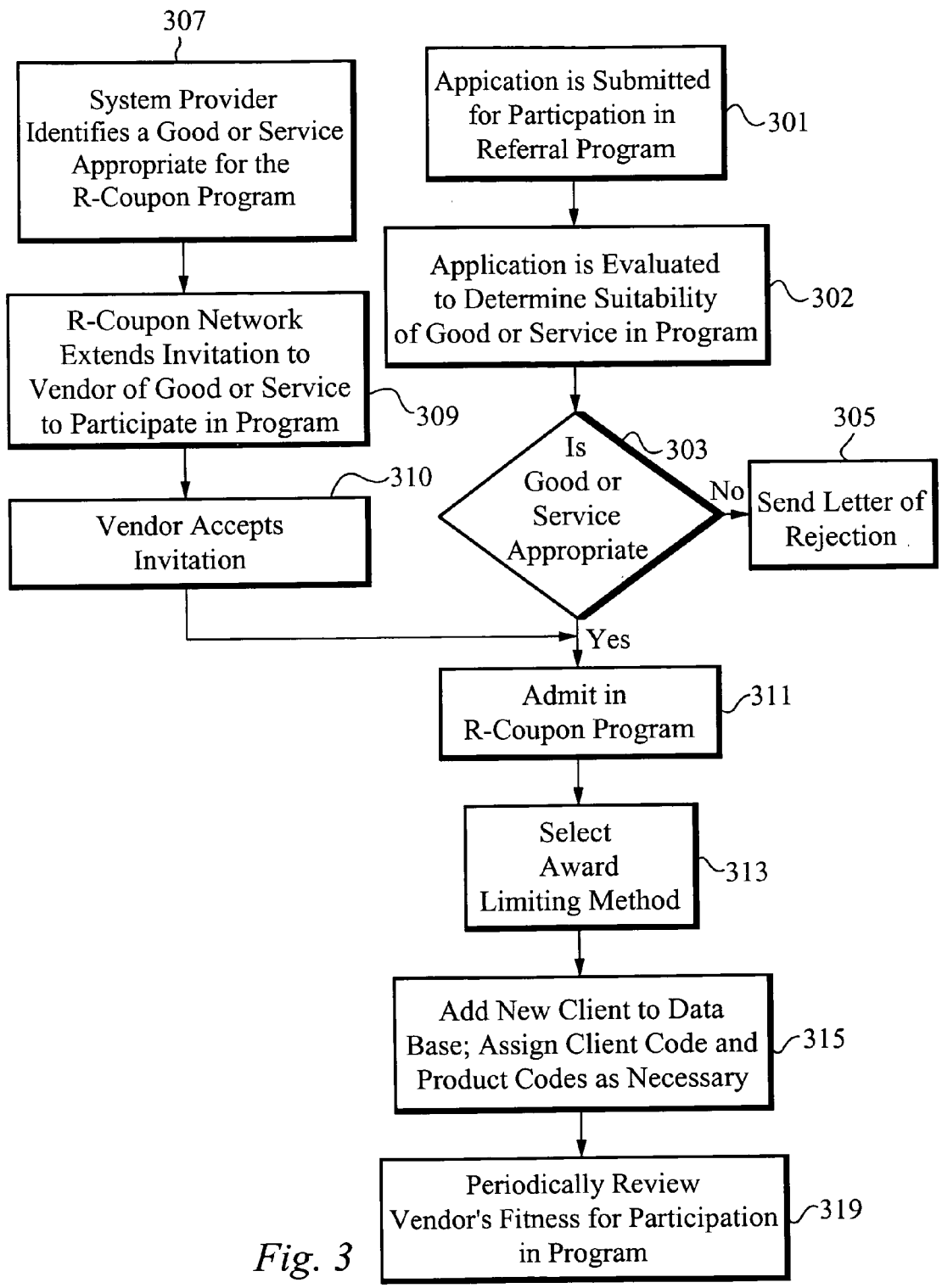
FIG. 3 is a flow chart of an application process for participation in the referral rewards program.

FIG. 3 discloses a process for admitting a good or service in the referral coupon network. Because the harvesting of genuine good will from satisfied clients is an important feature of the present invention, according to the preferred embodiment, referral incentives will advantageously be limited to goods and services of a specialized nature, or "big-ticket" items. For example, in a competitive market place for Sports Utility Vehicles, a recommendation from a friend or associate could be a significant factor in the sale of such a "big-ticket" item. For specialized goods or services such as purchase of a mountain bike, or selecting a hematologist or a violin instructor, a referral can be a particularly important means of attracting clients. Small-ticket items which are either reasonably generic, such as a gallon of milk, or which are well known already, such as a particular brand of nationally advertised beer, are not as likely to benefit from a referral system according to the present invention. If referrals for inexpensive commonplace goods or services were incorporated in the token referral system, it could flood the market place with referrals which were virtually worthless, and even annoying, degrade the value of referral system. To maintain the integrity of the referral program therefore, after receiving an application for participation in the referral program in the step 301, the application for participation in the referral coupon program is reviewed for suitability in the step 302. The goal of the review is to determine whether or not a particular good or service would enhance the referral coupon network. According to the step 303, the referral program evaluates whether the good or service is sufficiently specialized, a big ticket item, or otherwise likely to enhance the referral coupon program. For example, if there were some particularly distinctive feature about a brand of milk, for example, that the cows were fed fodder free from herbicides and pesticides, according to the steps 303, the reviewing committee might be more disposed to regard such a highly specialized product as suitable for participation in the referral coupon system. Persons concerned about herbicides and pesticides would be likely candidates to refer such a specialized product to others harboring such concerns. On the other hand, if a good or service were determined by the committee to be likely to undermine the value or integrity of the referral program, according to the step 305, the application is rejected.

In conjunction with reviewing whether a good or service is a big ticket item or specialized, the review process will advantageously consider the relatedness of the products, both for participation in the program, and for determining what goods or services offered in response to a previous transaction. An illustration of how relatedness of a product might affect admission to the program can be seen in an example of an outdoor shop specializing in robust sports may have equipment for both snow skiing and mountain climbing. Seeking participation in the referral coupon program, the shop could advance arguments for inclusion into the program. The arguments might include that the products are sufficiently related such that store itself is a specialized service provider with a specialized sales staff that is highly competent in assisting clients in ski and mountain climbing equipment. A review committee would review the merit of the arguments. If the committee found the arguments persuasive, the outdoor shop would be admitted for inclusion in the referral coupon program. In contrast, a national sporting goods franchise that carried everything from snow-mobiles to golf clubs might be rejected by the committee, determining that the products were diverse and not sufficiently specialized to qualify the sales personnel as service providers with expertise. This would not, however, preclude the manufacturer of a specific golf club from participating in the program, in which case a subsequent purchase of that brand of golf clubs would generate a reward for the referrer.

However, in the case of the sporting goods shop used in the above illustration, if such a store were to have a distinctive mode of operation that was a particular benefit to, or uniquely perceived by customers, the store could conceivably qualify for the program. For example, a retail store that provided exceptional service or an unusual composition of items for sale could potentially qualify. The primary qualification is that typical customers are satisfied and would be willing to make a referral to their friends, relatives or acquaintances, and that inclusion would enhance the r-coupon program. As discussed in conjunction with FIG. 3, the process of inclusion in and removal from the program is a fluid one, based on a dynamic evaluation of the entire calculus of marketing through the r-coupon program. Businesses that provided retail services (cleaning, construction, etc) or professional services such as attorneys or accountants could advantageously utilize the r-coupon referral system described herein. The invention described herein could apply equally to goods and services marketed to industries rather than consumers, such as print shops, software developers and distributers, supply houses, personnel recruitment and employment referrals to name a few diverse applications. Those skilled in the art of marketing goods and services will readily see the wide variety of fields in which this invention might be applied.

As noted, relatedness of products would advantageously be reviewed by a committee for determining what goods or services could be offered in response to a previous transaction. For example, an automobile manufacturer might advance an argument that since all of their vehicles had a one hundred thousand mile powertrain warranty, purchaser of a Sports Utility Vehicle would still have credibility recommending a mid-size commuter car with a similar power-train warrantee to a friend or associate. Again, the review committee would review the merit of the arguments, and determine the limits to which the automobile manufacturer could link different products to a sports utility vehicle transaction in the referral program. If approved, a purchaser of a Sports Utility Vehicle could forward token referrals for a broad line of automobiles manufactured by the manufacturer. If not approved, a purchaser of an Sports Utility Vehicle might be limited to forwarding referral coupons for that Sports Utility Vehicle.

For certain goods and services, a committee or person managing the referral coupon system may predetermine that they are appropriate for inclusion in the program in the step 307. There may still be decisions to make on which products can be linked for sales and subsequent referrals, however, as illustrated above. According to the step 309, the referral coupon system would extend an invitation to participate in the program. In the step 310 the vendor accepts the invitation.

According to the step 311, a provider of goods or services is admitted into the referral coupon system. Various administrative functions are undertaken, including selecting a rewards limiting method appropriate for that entity in the step 313, adding the new client to the data base, including the assignment of a client code, and distinct product codes if necessary in the step 315, and periodically reviewing the good or service to determine if it was, or remains, suitable for inclusion in the program in the step 319. If the reviewing committee determines that a particular good or service is debasing the value of the referral coupon system, the good or service is removed from the program.

According to the preferred embodiment of the present invention, the referral is done through e-mail. FIG. 4 discloses a sample e-mail message including a written text portion 402, an icon or trademark of the Provider 404, and an icon or trademark of the Vendor 406. The text portion 402 may be pre-written by the Vendor or Provider, selectable from a variety of pre-written letters, or entirely written by the recommending party. At least one URL link will provide access to a URL site describing the good or service being recommended. According to the embodiment depicted in FIG. 4, a URL site explaining the referral program is accessible through the r-coupon icon 404, and a URL site offering a product at a discount is accessible through the Vendor Icon 406. According to the preferred embodiment, even if a URL site is available through a Vendor Icon, the URL site will be controlled by or linked to the Provider's Data Base 500 (FIG. 5) discussed in greater detail below. The term "token" as used herein variously represents the icon or trademark identifying the token, the data, executable programs and links stored in the message or accessible through the icon, the rights and privileges associated with the holder of the token, or any combination of the above entities. Although FIG. 4 incorporates a two-icon display according to the preferred embodiment, it is understood that URL links may be accessible through a single icon or trademark, or simply through a standard URL address printed in standard alpha-numeric symbols. The two-icon embodiment is simply intended to illustrate one means for depicting a referral message, and is not intended to limit the forms of such a message. It is envisioned that most clients using the invention will want to have the invention's capabilities and features implemented with the look-and-feel of their own Web site. The implementers of the invention will design and deploy a tailored embodiment with the appropriate characteristics and attributes to appear like it is part of the client's Web site, making the provider of the invention an "invisible partner," tailoring the Web pages or other user interfaces and databases to the needs of the client.

Figure 5:
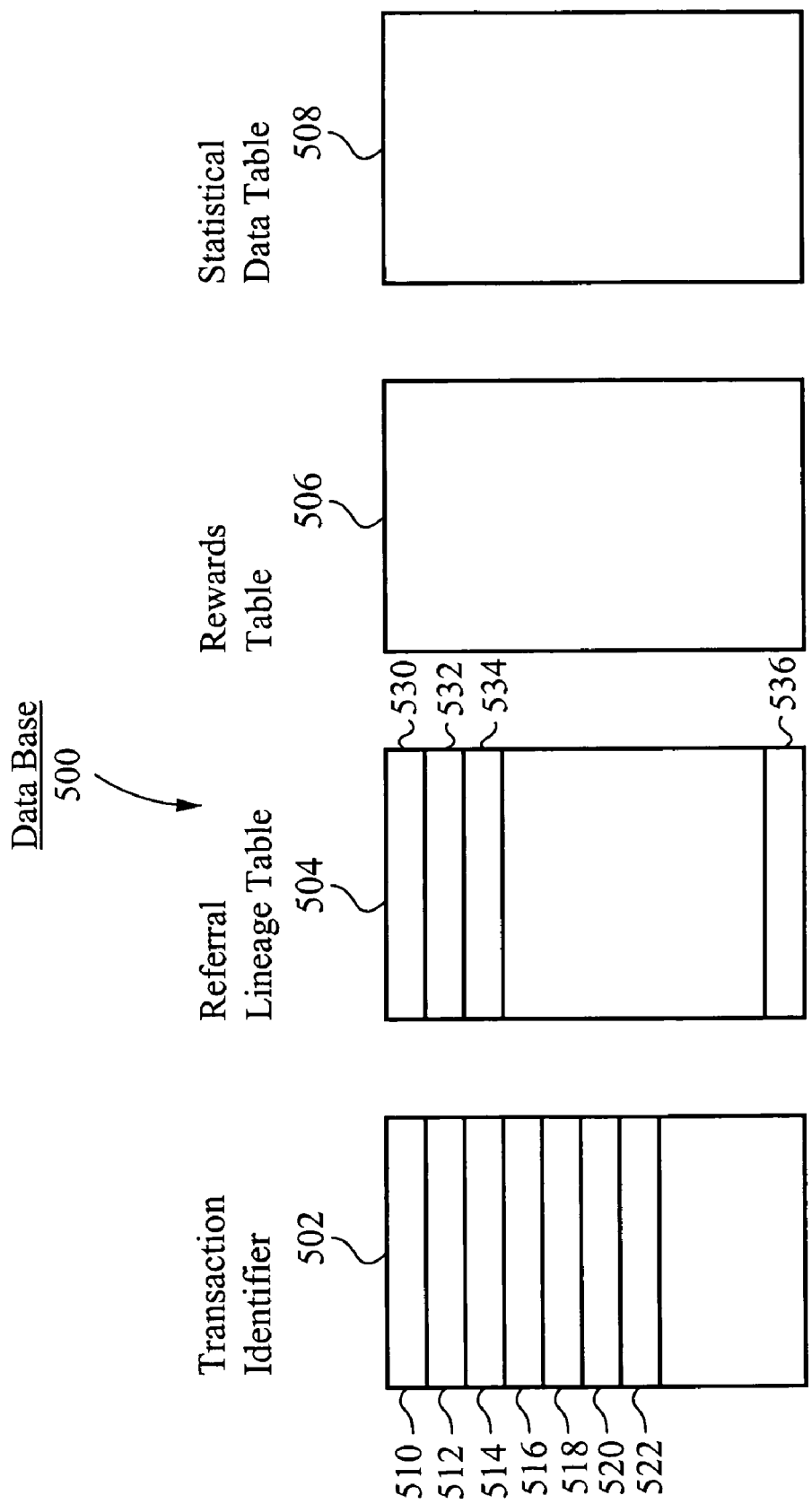
FIG. 5 is an illustration of a representative data base.

FIG. 5 discloses a data base 500 with a variety of possible data that may be stored therein. Because referrers must be tracked and recorded to award referral fees or referral credits, the URL link of FIG. 4 advantageously works in conjunction with a data base FIG. 5 maintained by the Provider. At a minimum, a data base 500 must have a Transaction Identifier 502 which correlates a specific body of data in the data base to a token or other message tracking identifier distributed to a referral party. It is understood that, although the Transaction Identifier 502 is largely discussed herein in terms of an association with a single token, this is for exemplary purposes only, and is not intended to limit the present invention. If a plurality of tokens are distributed from the same party as the result of a single transaction, as discussed further herein, those skilled in the art will know how to architect a data base capable of tracking multiple tokens generated by a single referring party.

Although the Transaction Identifier can include any information, such as the e-mail address of the transacting party that initiated the referral, it will advantageously include one or more of some of the following elements: a Vendor Number 510, a Merchandise Identifier 512 identifying a particular good or service for vendors who have multiple goods or services, a Transaction Date 514 for recording the date of the transaction, and a Transaction Code 516 for distinguishing that transaction from other transactions of the same vendor and product sold on the same day. Flags or additional data fields. (not shown) could be used for non-transaction based referrals discussed earlier.

A Consumer Offer Code 518 would define the goods and services being offered at a discount through the referral system. A Consumer Offer Code might extend a discount on a very narrow line of goods or services, such as a specific bicycle model or violin lessons. Alternatively, the Consumer Offer Code might cover a very broad line of goods or services such as an entire line of bicycles by a bicycle manufacturer, or any music lesson taken at a local music school. The Consumer Offer code is advantageously associated with the URL site, thereby controlling the number of URL sites linked to the initial site, which would define limits for the various goods or services being offered at a discount in conjunction with a prior transaction and resulting referrals. The cost and Discount fields 520, 522 identify the cost of a specific good or service, and the discount offered through the rewards field. If the Provider grants vendors the capacity to select separate rewards limiting methods, a Reward Limiting field could identify the method selected by a particular vendor.

A Lineage Table 504 tracks referring parties 530, . . . , 536 that may be eligible for referral rewards when a transaction results from a referral. Additionally, the table would advantageously record the reward available to each party in the referral lineage. If the reward available to a referrer were altered or reduced as the token passed from party to party, the referral reward for each party would be updated either periodically, or after a transaction resulted.

A data base advantageously comprises a separate Rewards Table 506 containing a record of all parties who have earned rewards as a result of a transaction, and the reward rights presently retained by them. Although any value from any source might be used as a default identifier, according to the preferred embodiment, the default identifier for recipients of referral rewards is their e-mail address. However, many persons frequently change e-mail addresses to avoid spammers or to secure net access at a lower cost; which can result in the loss of all earned rewards or credits, according to the preferred embodiment, reward recipients will have the option of establishing an alternative identification means such as a name or Personal Identification Number.

A Statistical Data Table 508 will advantageously collect data useful to vendors for appraising the effectiveness of the referral rewards program they have implemented, giving them the flexibility to alter it to increase the cost effectiveness of the program to them. In the preferred embodiment, the Statistical Data Table 508 is controlled by the Provider, with read-only access to individual vendors. Individual vendors, however, can download data from the Statistical Data Table into their own data bases. A security system limits access to authorized parties only.

It is important to note that the data table 500 elements described above are intended only as examples of the type of data which might be stored in the data base. According to one embodiment, separate secure file servers or computers housing a client data base may be assigned to each client. Data bases for different clients and vendors will preferably be comprised of unique data fields and other architectural features which are most advantageous to a particular client or vendor. Under certain circumstances one or more of the above data fields can be eliminated and other data fields can be added. For example, if the Data Base were segregated by vendors, there would be no need to include a Vendor Number 510 within the Transaction Identifier 502. Similarly, there are many forms of data not listed above which would be advantageously utilized by the rewards coupon system, or the vendors utilizing its services. Those skilled in the art will be able to eliminate data fields listed above that are not useful to a particular architecture, or identify other data types which are not disclosed in the above example, but which are useful to the enablement of various objectives of the present invention.

As noted, a data base preferably includes a means for corroborating the authenticity of a token, or the authenticity of a message being forwarded to the database. It is envisioned that, according to the Instant Forwarding with Tracking embodiment discussed below, this authentication preferably will take place through an e-mailing to the Provider, and that according to the Wholly Data Base Embodiment and Token Implementation embodiment discussed below, this authentication will preferably take place during a visit to the Provider's Web site. The authentication process, however, is not limited to any one channel or form. The essential feature of authentication is that a number, value, code or PIN associated with an e-mailing or referral can be authenticated within the data base. The authentication will be achieved through a serial number integral to the token, or integral to the message. The data base must either possess the identical serial number, or a means for correlating the serial number in the message or token to a value within the data base by means of a decoding algorithm. The serial number may be associated with an icon-type token, or simply embedded somewhere in an e-mail message being sent to the Provider. Because it is a common practice for servers or computer-type devices to generate a unique e-mail address for a variety of situations, it is envisioned that the serial number defining a message or token may be a unique e-mail address of the Provider, uniquely generated for each forwarding of a referral or token. This type of serial number would be particularly useful, though not limited to the Instant Forwarding with Tracking embodiment discussed below, which may be implemented without a visit to the Provider's Web site. Alternatively, the serial number may be the e-mail address of a party with referral or transaction privileges, which can also be confirmed as a party visits a Web site. According to the preferred embodiment, however, the serial number, whether within an icon-type token, e-mail message, or any other form of communication extending referral or transaction privileges, is advantageously generated from a combination of the vendor number, product number and transaction number within the data base, plus any update generated to distinguish a plurality of tokens associated with the same transaction. There is, however, no limit to the means or method by which a serial number validating a message or token might be generated. It is commonly known to those skilled in the art to assign a unique "suffix" to a URL site, which are often quite lengthy, so as to effectively create a "unique" URL address so that each visitor to a Web site accesses the Web site through a different and unique URL address. When an identifier or serial number is associated with an icon-type token, according to the preferred embodiment, the identifier will advantageously comprise a unique URL address to the proper Web site. It is, however, envisioned, that a single URL address is used to access a specific Web site, and that a serial number, password, pass code, PIN or other validation means is utilized when accessing the Web site.

Although most data discussed above would most advantageously be stored within the Data Base of the Provider, one skilled in the art could store some of the above listed data within the token itself, including a means for tracking referrals imbedded within the token itself. There are, however, multiple problems associated with storing security data with the token itself, or running executable programs with the token. First, it would be easier for a hacker to hack a token that is downloaded into his own computer than to hack into the Data Base of the Provider. Imbedded programs within tokens would invite hackers to substitute Trojan viruses for the imbedded referral tracking programs. Tokens could be counterfeited. Names or e-mail addresses could be added to the referral lineage embedded within the token, and transaction data could be altered offering greater transaction incentives and discounts than originally embedded, or offering transaction incentives on goods or services not originally imbedded in the token. Dangers of hacking, counterfeiting, spamming and token piracy are substantially reduced when a token is compared to a secure data base at least once per referral cycle. Tokens embedded in each message, however, will advantageously be made secure through an encoding process.

Another problem with the use of free standing tokens containing executable programs for updating the referral lineage is that the executable program might appear to an anti-virus program to be an embedded virus. As such, it might well be destroyed by the virus scanner, or deleted by users when warned by their anti-virus program that an unknown executable program is embedded within an e-mail message. Finally, there are privacy concerns when a list of referrals is embedded in a traveling token which could be examined by hackers. Although those skilled in the art will know how to minimize these risks and deficiencies, the fact remains that a secure data base which is compared against a token at least once per referral cycle will likely be more effective in curtailing token hacking. The token therefore will advantageously include a minimal amount of information, such as the information necessary to form a visual icon, URL links, and a token identifier by which the token can be verified against a secure data base as authentic and not hacked or altered. Critical digital information will advantageously be limited to a secure database of the Provider.

At least one referral system is envisioned, however, that minimizes the likelihood of spamming, piracy, and hacking, while not requiring a visit to the data base each cycle. According to this embodiment, a token would retain a record referral lineage, but rewards would be paid only to the initial referring party and the final referring party. By limiting rewards to the first and last party, there would be little incentive in hacking a coupon to insert a long chain of referrals. Additionally by incorporating a chain of referrals within the token, if a token were spammed to multiple parties from a single party not authorized to perform multiple mailings, duplicate tokens received at the data base would reveal the point in the lineage wherein the spamming occurred and appropriate measures taken.

Nevertheless, because of the problems associated with free-standing tokens, according to the preferred embodiment, the referral coupon process is best executed in a manner wherein the token is examined against a secure data base at least once per forwarding cycle. Updates are made to the data base or token data as needed. A "token update" or "issuing of a new token" may comprise an alteration of the data within the token, an alteration of the data base correlated to the token, of changes to both. It will, however, most advantageously include an update to the referral lineage 504 within the data base. At least four embodiments of the present invention are envisioned which accomplish this, the Wholly Database Implementation ("WDI"), the Token Implementation ("TI"), the Instant Forwarding with Tracking implementation ("IFT"), and the Dual Option Embodiment.

Because the forwarding of e-mail address to a Data Base of the Provider raises privacy concerns, according to the preferred embodiment, the Provider will promulgate and implement a strict company-wide policy prohibiting the sale or outside use of data for mailing lists, and post a standard message of the privacy policy on every message forwarded through the program. Additionally, computer security measures and safeguards will be in place and upgraded as needed to prevent unauthorized access to the data base by outside parties. Although these safeguards are envisioned for every embodiment of the present invention, they are particularly vital for those embodiments wherein the name of a party is added to the data base prior to that party's accessing of the URL site, as in the Instant Forwarding with Tracking method and Wholly Database Implementation. Furthermore, it will be appreciated by those skilled in the art that for all the embodiments of the present invention, the security measures described herein can be applied not only to the Provider's website and database, but also to website access granted by the referral e-mail, as well as to the generation and issuance of the coupon and referral e-mails.

The IFT implementation gives such users the option of forwarding the token to a friend or associate without first accessing the Web site. This embodiment is particularly useful for those users who may not have internet browsers, or cannot conveniently access their browser while reading their e-mail. Token tracking is achieved in the IFT implementation by means of dual e-mailings. As a token is forwarded from a first party to the subsequent party, an identifier such as the e-mail address of the subsequent party is forwarded to the Provider by the first party, along with a token serial number or similar means of authenticating the validity of the message being forwarded to the Provider.

Figure 6:
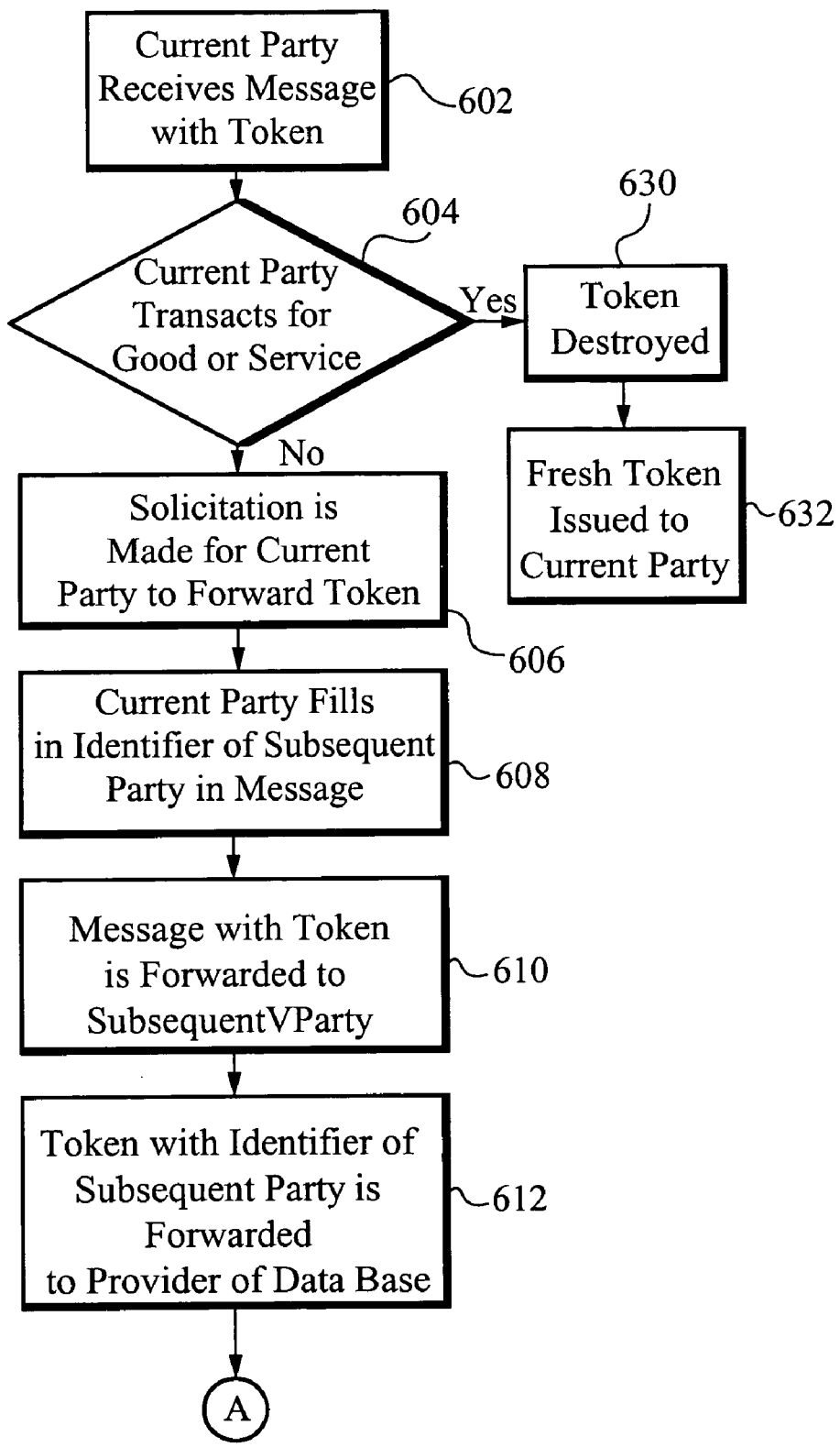
FIGS. 6 and 7 are a flow chart of a referral system according to the Instant Forwarding with Tracking embodiment of the present invention.
Figure 7:
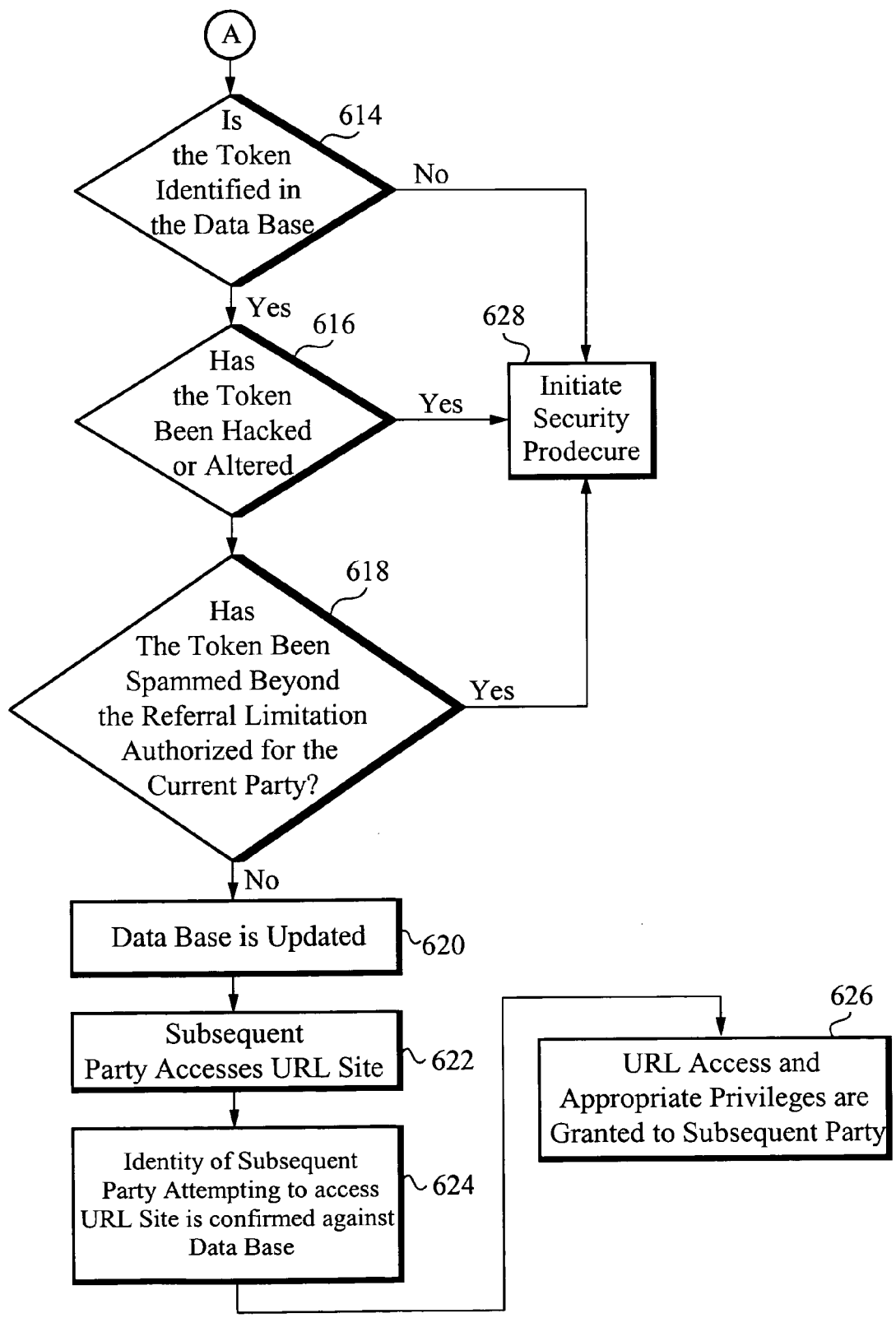

According to this embodiment, as disclosed in FIGS. 6 and 7, a first party receives a message with token through the referral coupon program in the step 602. The first party elects whether or not to transact for the good or service in the step 604. If the first party transacts for the good or service, to token is destroyed according to the step 630, and a fresh token is issued for the new transaction in the step 632. If the current party elects not to transact for goods or services, according to the step 606, a solicitation is made for the current party to forward the token. In the preferred embodiment, the solicitation incorporates the offer of a potential referral reward as an incentive for forwarding the token. In the step 608 the current party fills in an identifier of a subsequent party in a message. In the step 610, a message with the token is forwarded to the subsequent party. In the step 612, the token and an identifier of the subsequent party are forwarded to the Provider of the data base.

According to the preferred embodiment, the forwarding to the subsequent party and the forwarding to the Provider of the data base are initiated on the same send-e-mail-command. It is envisioned, however, that sending messages to the subsequent party and the data base Provider may be done through separate commands. Similarly, according to the preferred embodiment, the identifier of the second party which is forwarded to the data base Provider is the e-mail address of the subsequent party. The subsequent-party identifier can be something other than the e-mail address of the subsequent party to protect the e-mail privacy of the subsequent party. This, however, uses several additional steps not disclosed in FIG. 6. Specifically, when the subsequent party accessed the URL site, that party would provide the PIN or passcode which had been used to identify them.

When the message is received by the Provider data base, the token is confirmed as authentic in the step 614, free from evidence of hacking or altering in the step 616, and not spammed beyond the forwarding privileges granted the current party according to the examination conducted in the step 618. If the token is not in the data base, or has been altered, hacked or spammed, security procedures are initiated according to the step 622. If the token passes all security tests, the data base is updated in the step 620, including storing the e-mail address or other identifier of the subsequent party in the data base in an association with the token. In the step 622 the subsequent party attempts to access the URL site. In the step 624, the e-mail address or identifier provided by the subsequent party is evaluated against the data base for authenticity. If the subsequent party and the token held by the subsequent party are authentic, in the step 626, URL access is granted, as well as any privileges of purchase or referral associated with the token. It is understood, however, that the token confirmation process of steps 614, 616, 618 and 620 may be delayed until the subsequent party visits the Web site. However, a process more closely following the sequence depicted in FIGS. 6 & 7 is most likely to provide superior token protection and system performance. It is envisioned according to a Limited Pyramid Metering system as discussed below that a first party may have the privilege of forwarding a valid offer to more than one party. It is envisioned that multiple parties could be reached through a single e-mailing. According to the preferred embodiment, the e-mailing to multiple parties would protect the identities of the diverse parties from each other, such as a "blind-copy-to" field on current e-mailing systems. If a single e-mailing identifying multiple referrals is sent to the Provider, however, the e-mail addresses or identifiers must be visible and discernable to the Provider in order to facilitate the tracking process.

Figure 8:
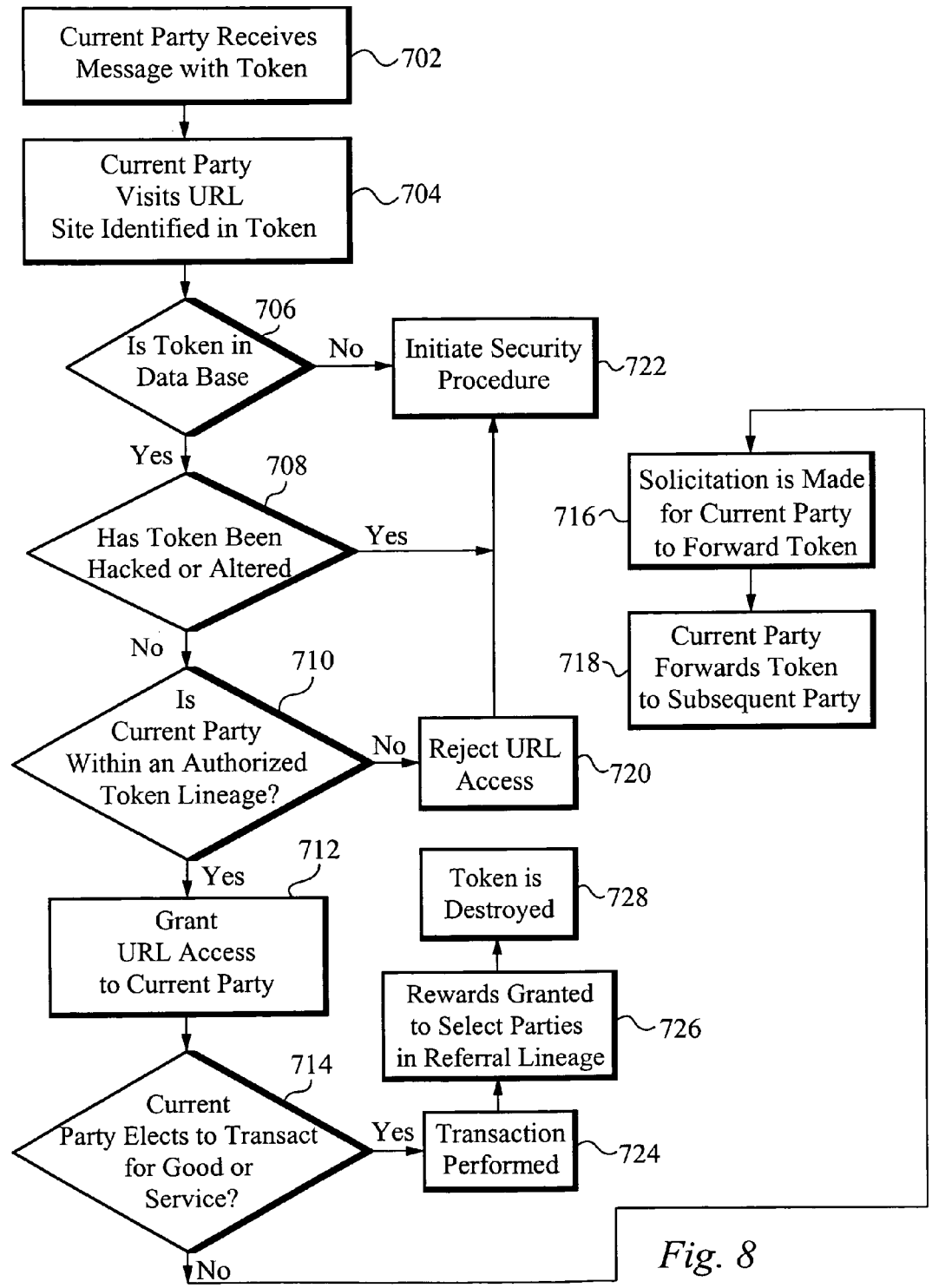
FIG. 8 is a flow chart of a referral system according to the Token Implementation embodiment of the present invention.

According to the Token Implementation embodiment of the present invention, the referral token is "updated" or "exchanged" when a party holding the token visits the URL site. As previously noted, a token exchange may be limited to updating the data base with no actual change in the data stored in the message. Alternatively, the token exchange may incorporate an alteration or update of data in the message itself. According to the preferred embodiment, however, a token update will comprise a data update or issuance of a new serial number in both the data base and within the data embedded within the message being forwarded. The update will advantageously include an update of the referral lineage, which is advantageously stored in the Data Base rather than the traveling token itself. In the preferred embodiment, authentication and security measures will also be implemented. FIG. 8 discloses one sequence of steps for performing the Token Implementation embodiment of the present invention. In the step 702, the current party receives a message with a token. The message is an invitation to transact for a good or service. In the step 704, the current party accesses the URL site. Upon arriving at the URL site, the data base is checked to confirm the authenticity of the token step 706. In the step 708, the process further inquires if there have been unauthorized changes to the token, either by a hacker or through transmission error. If the token has been counterfeited, spammed or hacked the process initiates security procedures the step 722. If the token has not been altered or hacked, the process examines whether the current party attempting to access the URL site is authorized in the step 710. If the current party falls outside the token lineage, URL access is rejected according to the step 720, and security procedures are initiated according to the step 722. In the step 712 the current party is granted access to the URL site. If the current party elects to transact for the good or service in step 714, the transaction is performed in the step 724, incentive rewards are granted to select parties in the referral lineage in the step 726, and the token is destroyed in the step 728. If the current party declines to transact for the good or service, solicitation is made for the current party to forward the token in the step 716. In the step 718, the current party forwards the token to a subsequent party. According to one embodiment, the previous token holder will relinquish the ability to transact for the good or service by an affirmative interactive decision made during their visit to the URL site not to transact for the good or service. According to another embodiment, the current party will forfeit the right to transact for a good or service when a subsequent party visits the URL site, the subsequent party possessing a valid token forwarded by the current party.

An advantage of this method is that it insures the confidentiality of the next token recipient. An e-mail address or other identifier is not added to the Provider's Data Base until a party elects to visit the URL site. This is attractive for potential referrers who are reluctant to disclose the e-mail address of parties whose privacy they seek to protect, but to whom they desire to offer a referral.

Figure 9:
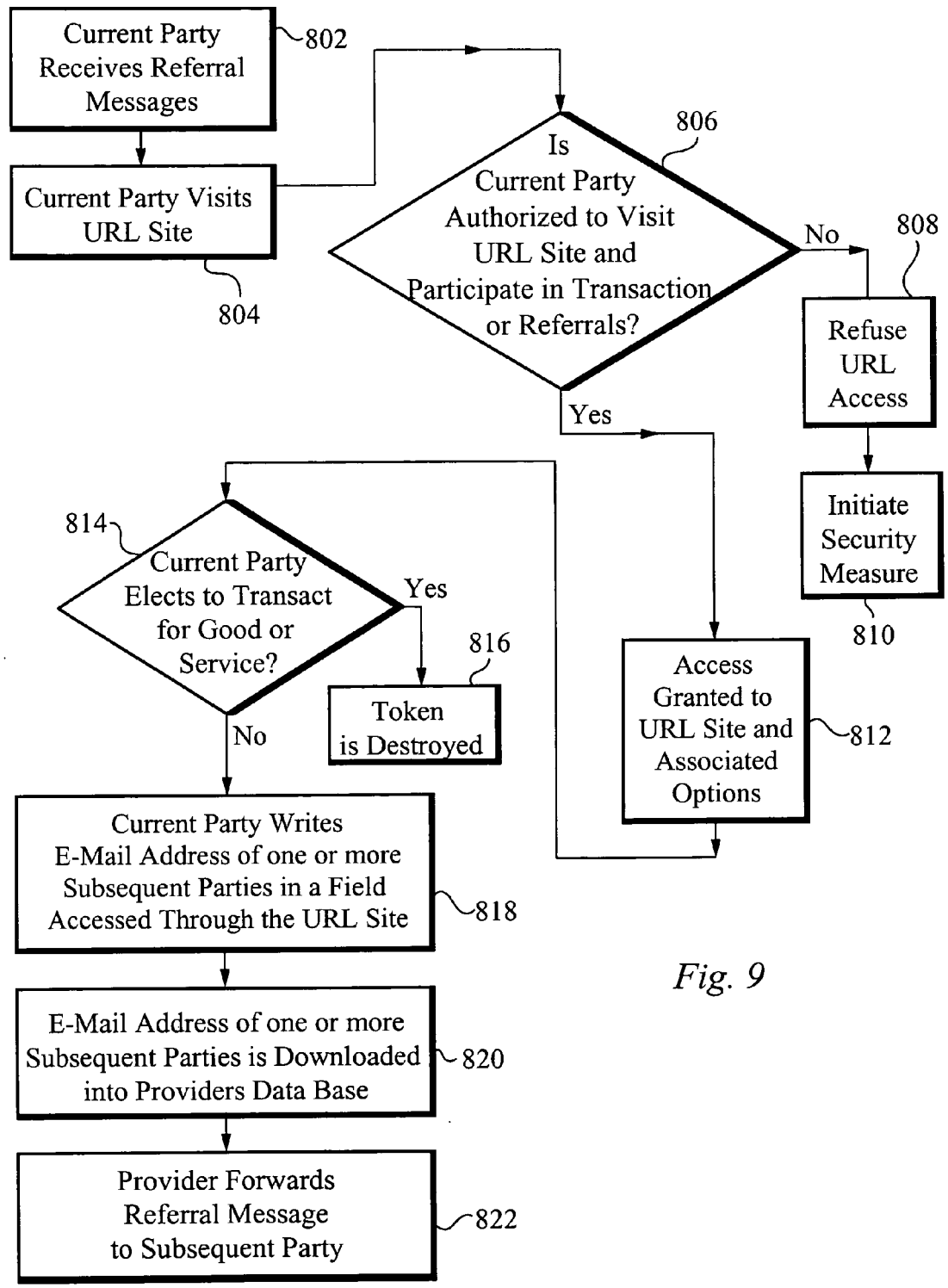
FIG. 9 is a flow chart of a referral system according to the Wholly Data Base embodiment of the present invention.

FIG. 9 discloses a Wholly Data Base embodiment of the present invention. According to this embodiment, a party receives a referral according to step 802 and visits the URL site through the link embedded in the token in the message according to the step 804. In the step 806, the data base is searched to determine if the current party has authorization to visit the URL site. If authorization is denied, the current party is denied access to the URL site the step 808, and security measures are initiated the step 810. If authorization is granted, the current party is granted access to the URL site with appropriate privileges regarding transactions and referrals in the step 812. According to the step 814, the current party elects whether or not to transact for the good or service. If transaction takes place, the token is destroyed in the step 816. If the current party elects not to transact for the good or service, the current party is given the opportunity to write the e-mail address of a subsequent party in a field which was accessed through the URL site in the step 818. The e-mail address of the subsequent party is downloaded into the data base according to the step 820 and forwarded with a referral message from the data base to the subsequent party in the step 822.

The implementation of the embodiments of the present invention are not intended to be mutually exclusive. According to the preferred embodiment of the present invention, a user will have the option of implementing any one of these embodiments according to instructions made available to the user. This will advantageously include a simple explanation of how the four referral methods work, and possibly an icon-type menu for selecting the preferred method.

In every embodiment of the present invention, it is envisioned that any security measures enacted are dependent upon the nature of the infringement. For example, if a first party were to elect not to transact for a good or service, and forwarded referral privileges on to a second party, only to subsequently attempt to access the URL site, security measures might be limited to a warning that the first party would be granted "read only" privileges to the URL site, but had forfeited the right to access a portion of the URL site for executing transactions or referrals. However, under a circumstance where the data base detected counterfeit tokens being submitted, security measures might include contacting state or federal law enforcement authorities to investigate a variety of state and federal criminal violations including trademark and patent infringement, violation of various computer hacking statutes, and attempted larceny.

The embodiments of the present invention have been described largely in terms of a metering algorithms that grant only one forwarding token to each token recipient, thereby forming token-passing-chains exclusively made from successive links. In harvesting good will of an actual consumer, however, it is axiomatic that a direct recommendation of a friend or associate is usually more powerful than a recommendation that has come indirectly through one or more intermediary parties, possibly being forwarded to an e-mail box of someone who has never heard of the original transacting party. Through a process of Limited Pyramid Metering, a greater number of referral privileges are given to parties closer to the original transacting party. For example, a transacting party transacts for a good or service. The transacting party receives five separate privileges or tokens to refer the good or service to a first generation of referral recipients. The first generation of parties in the referral lineage are each given the right to forward two tokens. The second and third generations would have the privilege of forwarding the token only once. If a maximum-chain length reward limiting program were implemented at the level of the fourth generation in conjunction with the Limited Pyramid Metering process, tokens distributed to the fourth generation could not be forwarded. The fourth generation would therefore receive the referral coupon with the right of purchase, but would not have rights to forward it. According to this example, there are five first generation recipients, ten second generation recipients, ten third generation recipients, and ten fourth generation recipients, totaling thirty-five potential recipients of referral coupons. Five are directly acquainted with the transacting party, and ten more are only one generation removed.

In contrast to Limited Pyramid Metering, if thirty-five referrals were generated through a strictly linear chain, only one fifth the number of parties would be receive the referral directly from the transacting party as in the limited pyramid embodiment according to the above example, and the number of referral recipients one generation removed would only be one tenth that of the pyramidal example. In the linear chain referral, thirty one of the thirty five parties would be further removed from the transacting party than any party according to a limited pyramid embodiment of the above example. Accordingly, a Limited Pyramid Metering system is preferred over a linear chain referral system. One skilled in the art will be able to control token duplication and forwarding privileges from the Provider's Data Base to implement the controlled-pyramid referral method in conjunction with all referral methods discussed herein, including the Wholly Data Base implementation, the Instant Forwarding with Tracking implementation, and the Token Implementation. In addition to limiting the number of referrals one party may forward, and the number of referrals that can be generated as a result of a single transaction, anti-spamming control may variously include limitations on the number of referrals sent or tokens issued within a fixed time frame. As already noted, tokens will advantageously comprise a shelf-life or other limiting feature or features. Such limitations will advantageously be conspicuously displayed within the message, preferably in close association with an icon if utilized, thereby minimize the likelihood of "spamming" or forwarding tokens which are already exhausted. The data base will advantageously record the e-mail addresses of parties which forward exhausted tokens, or are determined to be responsible for hacking, spamming, or other forms of token piracy. Security measures adopted by the Provider may range from a warning letter that a certain party forwarded an exhausted token, to "blacklisting" certain e-mail addresses, and, when possible, preventing tokens from being issued to such black-listed parties. The Provider will institute these, and any other anti-spamming policies and procedures as seem reasonable or necessary.

Figure 11:
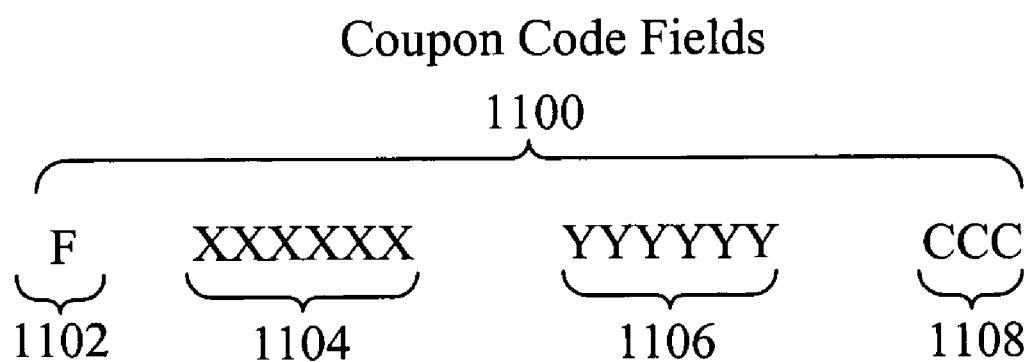
FIG. 11 is a schematic of coupon code fields embedded in a token in a message.

Security measures adopted by the Provider may include a specific coupon code format recognizable only by the Provider's database for a token to be valid. FIG. 11 shows an example of a coupon code 1100 embedded in the token of a message. The coupon code can have a format code field 1102, a human readable field 1104, a unique coupon number 1106, and a check characters field 1108. It will be appreciated by those skilled in the art that a coupon code can have all or some of these fields, and that FIG. 11 is shown simply for exemplary purposes. The format code field 1102 determines the number of characters in each of the other fields of the coupon code 1100. The format code field 1102 indicates whether digits alone, letters alone, or mixed letters and digits are used by the other fields of the coupon code 1100. The format code field 1102 also indicates the checking algorithm used in computing the check characters field 1108.

Figure 12:
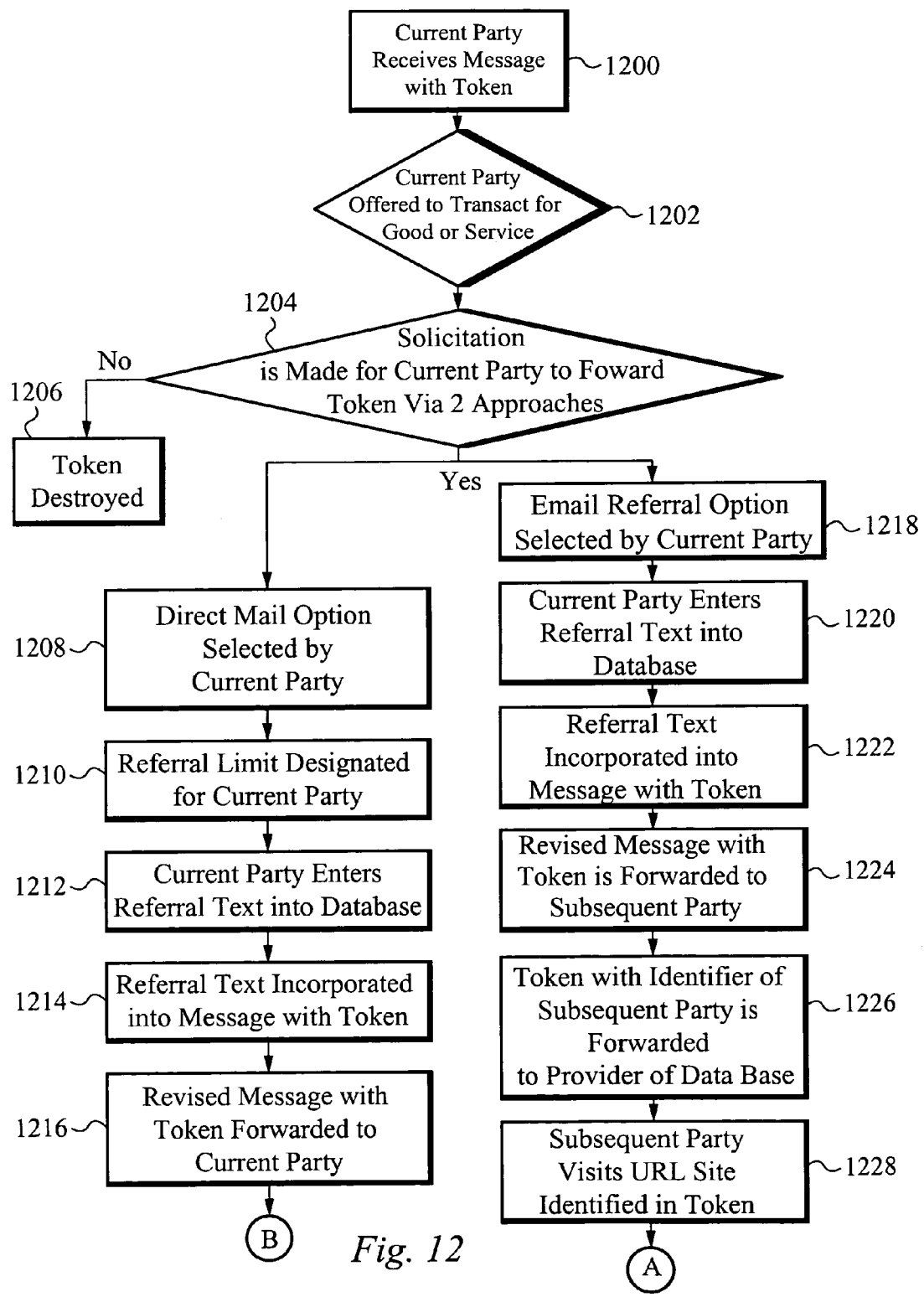
FIGS. 12, 13 and 14 are flow charts of a referral system according to the Dual Option embodiment of the present invention.
Figure 13:
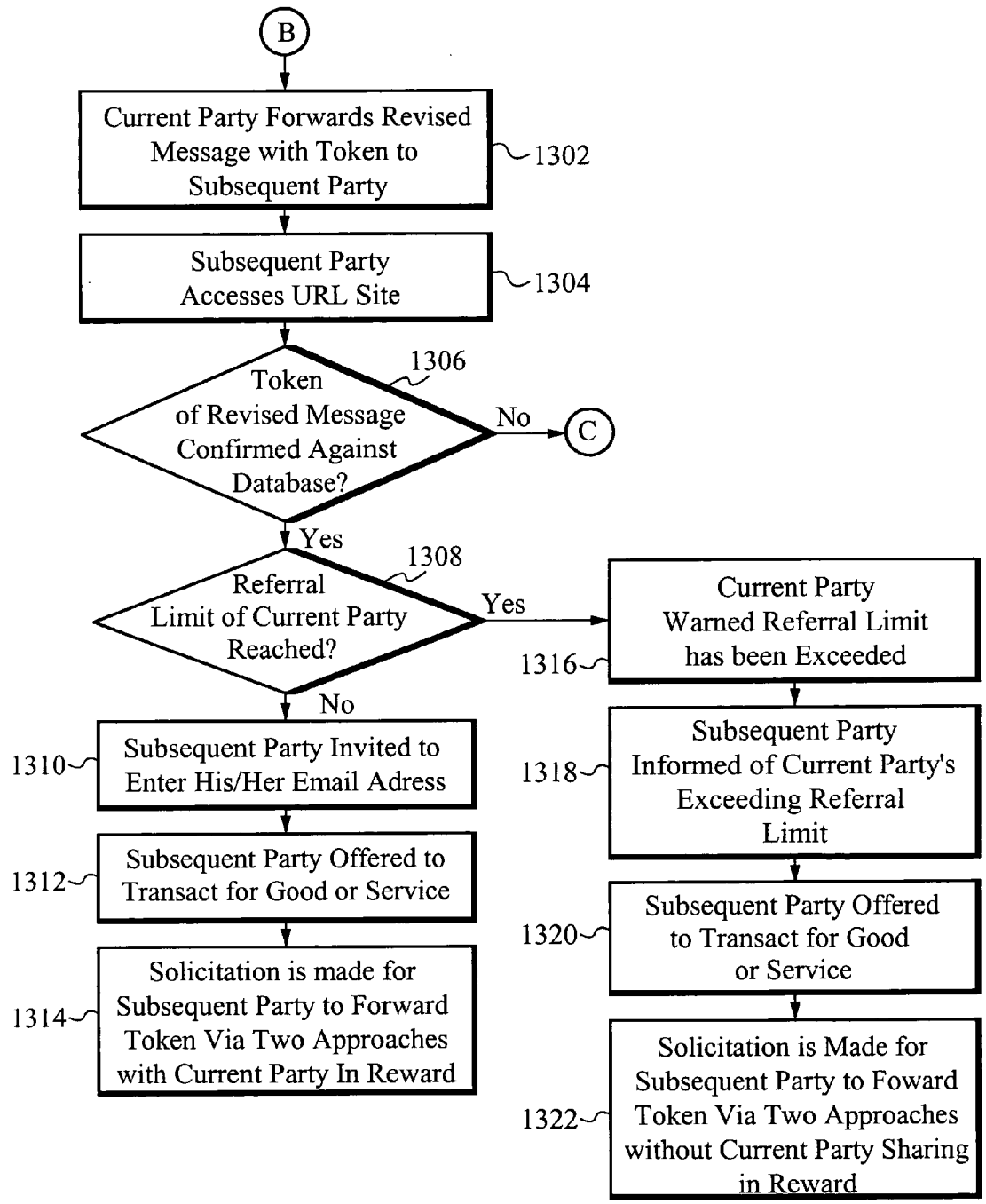
Figure 14:
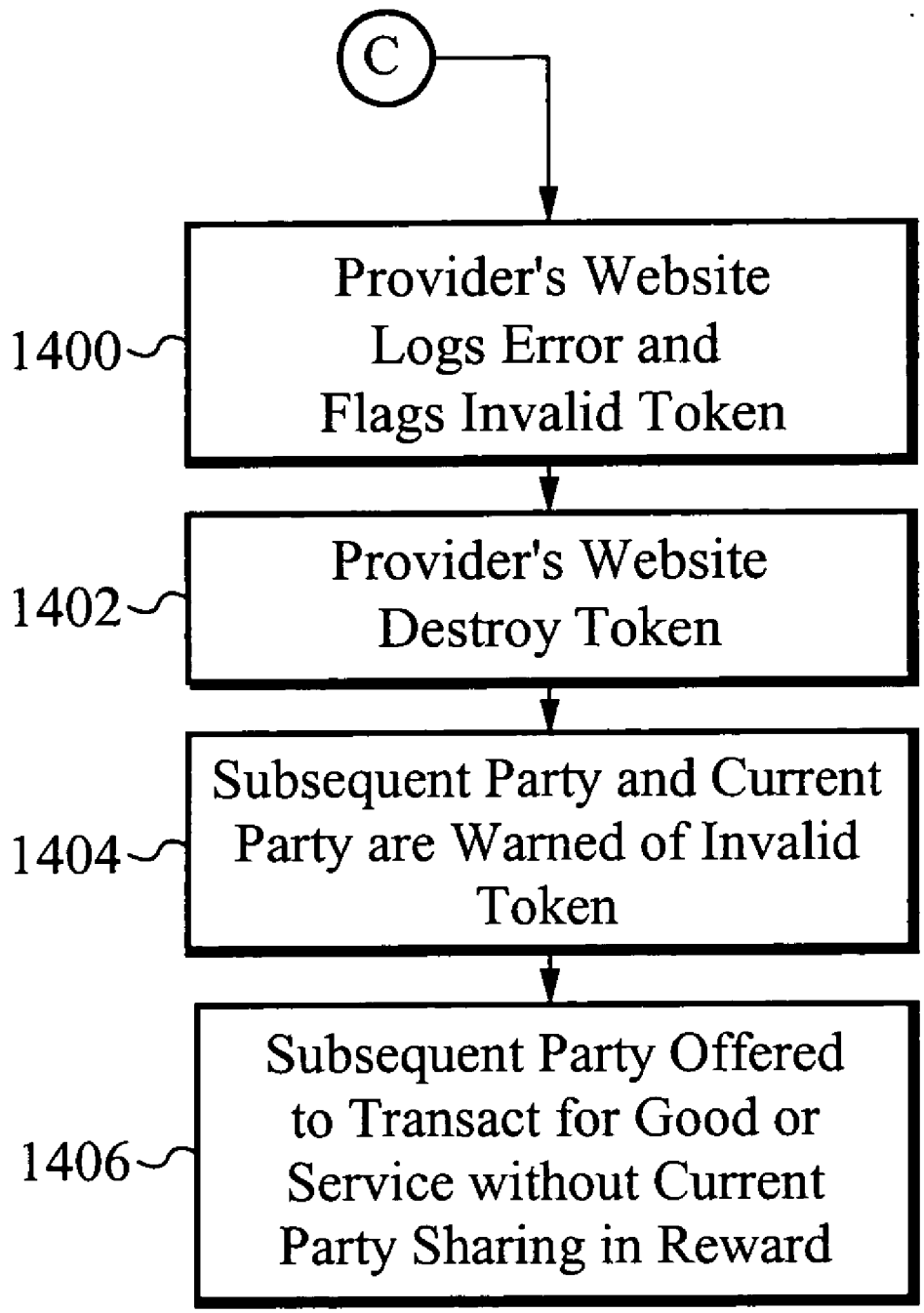

FIGS. 12, 13 and 14 show a further embodiment of the present invention called Dual Option Embodiment. The purpose of this embodiment is to address concerns of some customers in entering their friends' email addresses into the Provider's r-coupon web site. Those customers may fear that the e-mail addresses they would supply would be used for undesirable purposes, such as spamming. Furthermore, some customers may feel it inconvenient to paste multiple addresses from their contact address book into a referral page contained in the Provider's web site. Dual Option Embodiment allows for customers to feel safe in providing their personalized referrals to their friends and family in a convenient, painless manner.

Turning to FIG. 12, at step 1200, a current party receives a message with a token. The current party then visits the offer page on the Provider's web site and decides to participate in the program. The offer page offers a reward program to the customer for personalized referrals of the Provider's goods or services. In the preferred embodiment, the customer reaches the offer page from an e-mail he or she received from the Provider that contained a token and a summary of the offer page, with a link to the Provider's web site and offer page. The current party is invited to enter his or her e-mail, to confirm that the original message with token is authentic and valid. The e-mail address furnished by the current party and the token within the message must correspond with data in the database, for the token to be authentic and valid.

At step 1202, the customer is offered to transact for the good or service. Regardless of whether the customer purchases the good or service, a solicitation is made for the current party to forward the token through one of two options at step 1204. The current party is offered a potential reward for forwarding the token to a subsequent party. If the current party declines the solicitation, at step 1206, the token is destroyed, the current party completes a check-out if the current party purchased a good or service, and the current party exits the web site.

If the current party indicates that he is interested in forwarding the token, then he is presented by two options. Preferably, these two options are represented by clickable buttons on the website menu. As discussed previously, the two options are the Direct Mail Option and the Email Referral Option. If the current party selects the email referral option at step 1218, then the current party can enter a referral text and an e-mail address of the subsequent party into the Provider's database at step 1220.

At step 1222, the referral text is incorporated into the message with the token that was originally sent to the current party. At step 1224, the revised message with token is forwarded to a subsequent party by the Provider's database, using the subsequent party's e-mail address entered by the current party into the Provider's database at step 1220. At step 1226, a token with identifier of the subsequent party is forwarded to the Provider's database as well. At step 1228, the subsequent party visits the URL site identified in the token. Then the process continues at step 614 of FIG. 7 where the token is identified in the database.

If, however, the current party selects the Direct Mail Option at step 1208 of FIG. 12, then the current party is provided with a referral limit at step 1210. Such a referral limit determines how many valid offers the current party is allowed to extend to subsequent parties and still share in a reward. In the preferred embodiment, after being informed of the referral limit assigned to him, the current party is warned not to exceed the referral limit.

At step 1212, the current party enters his referral text into the database of the Provider. Preferably, the referral text can be entered directly by the current party through a text editor furnished by the web site of the Provider. At step 1214, the current party's referral text is incorporated into the message containing the token that was originally sent to the current party. In the preferred embodiment, the current party then can view the referral text as it is incorporated with the original message with token that the current party received at step 1200.

If the current party is pleased with the text of the revised message with token, then the current party can indicate that he is done with entering the referral text. In the preferred embodiment, the current party can indicate this to the Provider's text editor by clicking on a menu button to send the revised message with token to the current party. At Step 1216, the revised message with token is then forwarded to the current party.

Once the revised message with token is received by the current party at the current party's present e-mail account, then the process continues at step 1302 of FIG. 13. At step 1302, the current party at his leisure can forward the revised message with token to a subsequent party. The subsequent party at step 1304 reviews the revised message with token and decides to access the URL site of the Provider. Access is accomplished by clicking on the token embedded in the revised message which includes a hyperlink to the URL site of the Provider. The token in the revised message is confirmed against the Provider's database.

If the token does not appear in the Provider's database, then the process continues at step 1400 of FIG. 14. At step 1400 the Provider's website logs the error and flags the invalid token, if possible. At step 1402, the Provider's website destroys the token. At step 1404, the subsequent party and current party are warned of invalid token. At step 1406, the subsequent party is offered to transfer for a good or service without the current party sharing in the reward. If, on the other hand, the token does appear in the Provider's database, then the process continues at step 1308 of FIG. 13. At step 1308, the Provider's database checks to see if the referral limit imposed upon the current party has been reached.

If the referral limit has not been reached, the subsequent party is now invited by the Provider's website to enter his or her e-mail address at step 1310. At step 1312, the subsequent party is also offered to transact for a good or service of the Provider. At step 1314, regardless of whether the subsequent party accepts the offer to transact for the good or service, a solicitation is made for the subsequent party to forward the token via two approaches with the current party sharing in the reward. If the subsequent party accepts the solicitation, then the subsequent party fills the shoes of the current party at step 1204 of FIG. 12 and the process continues with the subsequent party choosing either the direct mail option or the e-mail referral option to forward the token. If the subsequent party declines the solicitation, the token is destroyed.

If the referral limit has been reached at step 1308, however, the current party is warned of the referral limit having been exceeded at step 1316. The subsequent party is informed of the current party's exceeding the designated referral limit at step 1318. The subsequent party is then offered to transact for a good or service of the Provider at step 1320. At step 1322, a solicitation is made for the subsequent party to forward the token via two approaches without the current party sharing in the reward. If the subsequent party accepts the solicitation, then the subsequent party fills the shoes of the current party at step 1204 of FIG. 12 and the process continues with the subsequent party choosing either the direct mail option or the e-mail referral option to forward the token. If the subsequent party declines the solicitation, the token is destroyed.

In the preferred embodiment of the Dual Option embodiment, if the current party selects the email referral option at 1218, the current party is also offered the direct mail option after providing the referral text and the subsequent party's e-mail address at step 1220. Hence, it will be appreciated by those skilled in the art that both options of direct mail option and email referral option can be selected by the current party in one entire process. It will also be appreciated by those skilled in the art that the Dual Option embodiment further allows for one option to be unavailable at any time, at the Provider's option. Thus, a Provider may wish to have simply the Direct Mail Option available or the Email Referral Option available to the current party at any one time, depending upon the present needs of the Provider.

Finally, the present invention further comprises a rewards distribution algorithm that allows for a Provider to issue a reward that remains constant. The constant rewards algorithm allows for the Provider to know that only one reward will be given, and the reward's total value will not change, regardless of how many people are involved in finding a purchaser. The algorithm further reserves more reward for those who are the original referrers and those who find actual purchasers for the good or service of the Provider. Those skilled in the art will appreciate that the algorithm and the amounts noted above are exemplary only, and that the constant rewards algorithm can take on many forms. However, one example of a constant rewards distribution algorithm is as follows:

The original referrer receives a reward calculated from the formula of $X+(Z/(2N-2))$. The referrer referring an actual purchaser receives a reward calculated from the formula of $Y+(Z/(2N-2))$.

All intermediate referrers receive a reward calculated from the formula of $Z/(N-1)$, where $X=40$ $Y=20$ $Z=40$ and N=total number of referrers.

By making $Y<X$, there is a partial preservation of the reward for the original referrer should a second referrer decide to pass the coupon around to others before making a purchase. To minimize this type of fraudulent behavior, the total amount of the reward remains constant. The Provider's database can track the chain of referrers and referees to insure that the reward will remain constant. The Provider may also wish to adjust the amounts of reward distribution.

FIG. 15 shows an example of the constant rewards algorithm. Here, the Provider has set the constant reward to be $100. The table shows the distribution of the constant reward of $100 as N increases from 1 referrer to 5 referrers. When there is only 1 referrer (namely, AA), where N is equal to 1, a special case applies where AA, the only referrer, receives the entire reward. In FIG. 15, AA receives the total reward of $100. Where there are two referrers (N=2), AA gets $60 and BB gets $40, according to FIG. 15. AA as the original referrer receives a reward of X+(Z/(2N−2)). Applying the set values of X, Y, and Z noted above, X+(Z/(2N−2))=40+(40/(2(1)−2))=40+(40/2)=$60. BB as the person referring the actual purchaser receives a reward of Y+(Z/(2N−2))=20+(40/(2(2)−2))=20+(40/2)=$40.

Where there are three referrers (N=3), AA as the original referrer gets a reward using the formula X+(Z/(2N−2)), where the reward amounts to $50. CC as the person referring the actual purchaser receives a reward using the formula Y+(Z/(2N−2)). So, CC receives a reward of $30. BB as the only intermediate referrer receives a reward using the formula Z/(N−1)=40/(3−1)=$20.

Where there are four referrers (N=4), AA as the original referrer gets a reward using the formula X+(Z/(2N−2)), where the reward amounts to $47. DD as the person referring the actual purchaser receives a reward using the formula Y+(Z/(2N−2)). So, DD receives a reward of $27. BB and CC as the two intermediate referrers each receive a reward using the formula Z/(N−1)=40/(4−1)=40/3=$13.

Finally, where are five referrers (N=5), AA as the original referrer receives a reward using the formula X+(Z/(2N−2)), where the reward amounts to $45. EE as the person referring the actual purchaser receives a reward using the formula Y+(Z/(2N−2)). EE receives a reward of $25. BB, CC, and DD as the three intermediate referrers each receive a reward using the formula Z/(N−1)=40/(5−1)=40/4=$10. It will be appreciated by those skilled in the art that the algorithm can be used regardless of how many referrers there are, using the formulas noted above.

The present invention has been described in terms of specific embodiments incorporating many specific details offered to facilitate an understanding of the principles of construction and operation of the invention. The reference herein to specific embodiments and details thereof are not intended to limit the scope of the claims appended hereto. It will be apparent to those skilled in the art that modifications may be made to the embodiments chosen for illustration without departing from the spirit and scope of the invention. Although the preferred embodiment for messaging is generally through Internet access via the Web and e-mail, other electronic techniques such as instant messaging and alpha numeric paging devices could be included. Further, non-computer messaging, such as conventional postal mail are envisioned. For example, when vendors have postal addresses of current customers but not e-mail addresses, the initial message directed to the customer to access the Web site would be sent by postal mail. At some stage in the referral process a referrer may not know the e-mail address of the person to whom the referral message is directed. Accordingly, the procedures in the invention allow for a postal message (post card, letter, customized brochure, etc.) to be sent to the referee. An embodiment may be comprised of multiple messaging and communication capabilities including but not limited to e-mail, instant messaging, Web browser pages and forms, alphanumeric pagers, telephony, voice over Internet, postal mail, express mail, etc. It will also be appreciated by those skilled in the art that in any of the embodiments of the present invention, a referrer can set up a password-protected account on the Provider's website, as a security measure for making valid referrals and for keeping track of the reward to be bestowed upon the referrer.

What is claimed:

1. A method of marketing a marketable entity selected from a group consisting of goods and services, the method comprising the steps of:

a. offering a potential reward from a Provider to a first party in exchange for promotional assistance of the first party, the promotional assistance comprising assistance in a forwarding of a first e-mail message to a second party, the first e-mail message comprising a personalized referral for the marketable entity, a first set of data comprising a first serial number and a first URL link;

b. creating a first Web site corresponding to the first URL link, the first Web site providing information on the referenced marketable entity and an offer to transact for the referenced marketable entity;

c. correlating the first set of data in the first e-mail message to a first set of database data within a digital database controlled by the Provider, including data within the database relating to the potential reward offered to the first party in exchange for promotional assistance;

d. forwarding the first e-mail message from the Provider to the first party; and e. configuring the first e-mail message to be forwarded from the first party directly to the second party, wherein the first party does not give any identifying information about the second party to the Provider.

2. The method according to claim 1 wherein the first e-mail message comprises a token in the form of a first icon.

3. The method according to claim 1, wherein the first party directly forwards the first e-mail message to the second party via an e-mail account of the first party, without assistance from the Provider.

4. The method according to claim 1, wherein the step of forwarding the first e-mail message from the Provider to the first party is preceded by the steps of:

a. designating a limit of how many times that the first party can forward the first e-mail message; and b. informing the first party of the limit.

5. The method according to claim 1, wherein the step of forwarding the first e-mail message from the Provider to the first party is preceded by the steps of:

a. entering at least a portion of the personalized referral for the marketable entity by the first party into the digital database of the Provider; and b. incorporating the portion of the personalized referral into the first e-mail message.

6. The method according to claim 5, wherein the step of entering the personalized referral for the marketable entity by the first party into the digital database of the Provider is preceded by the step of selecting a direct mail option on the first Web site by the first party.

7. The method according to claim 6, the step of selecting the direct mail option on the first Web site by the first party being preceded by the steps of:

a. selecting a referral e-mail address option on the first Web site by the first party; and b. entering an e-mail address of the second party by the first party into the database controlled by the Provider.

8. The method according to claim 7, wherein the step of entering an e-mail address of the second party by the first party into the database controlled by the Provider is preceded by the steps of:

a. establishing an account on the first Web site by the first party; and b. entering a designated password by the first party recognizable by the database controlled by the Provider, to allow the first party to add data into the database.

9. The method according to claim 1, wherein the step of forwarding the first e-mail message from the first party directly to the second party is accomplished via an e-mail server utilized by the first party.

10. The method according to claim 1, wherein the method further comprises the steps of:
1. attempting to access the first Web site by the second party;
2. evaluating an authorization of the second party to access the first Web site based on the correlation of the first set of data in the first e-mail message to the first set of database data within the database; and
3. evaluating validity of the forwarding of the first e-mail message to the second party, based upon whether the first party has reached a limit of how many times that the first party is permitted to forward the first e-mail message.

11. The method according to claim 10, wherein the method further comprises the steps of:
1. validating the forwarding of the first e-mail message to the second party;
2. directing the second party to the first Web site that provides information on the referenced marketable entity and an offer to transact for the referenced marketable entity; and
3. advancing a counter to keep track of how many times the first party has forwarded the first-email message.

12. The method according to claim 11, wherein the method further comprises the steps of:
1. invalidating the forwarding of the first e-mail message based on the limit having been reached;
2. informing the second party that the coupon is invalid because the first party exceeded the limit of how many times the first party is permitted to forward the first e-mail message;
3. providing an alternative offer to transact for the referenced marketable entity to the second party, through which the first party does not receive a reward; and
4. informing the first party that the first party exceeded the limit of how many times the first party is permitted to forward the first e-mail message.

13. The method according to claim 1, wherein the first e-mail message further comprises an coupon code recognizable by the database controlled by the Provider.

14. The method according to claim 13, wherein the coupon code comprises a field of check characters used in validating the first e-mail message.

15. The method according to claim 13, wherein the coupon code comprises a unique offer number corresponding to an offer that has been issued within the limit designated to the first party.

16. The method according to claim 1, wherein the method further comprises the step of issuing a reward to select parties according to a constant rewards distribution approach.

17. The method according to claim 16, wherein the constant rewards distribution approach wherein the reward in total remains constant, regardless of how many parties receive a portion of the reward.

18. The method according to claim 17, wherein the constant rewards distribution approach further comprises a tracking system which allows for the Provider to identify the select parties who will be rewarded prior to distribution of the reward.

19. A method of marketing a marketable entity selected from a group consisting of goods and services comprising the steps of:
a. transacting through an electronic information network for a first marketable entity by a first party;
b. offering a reward to a first party through the electronic information network to assist in recommending a second marketable entity substantially similar to the first marketable entity to a second party wherein the recommendation results in a transaction;
c. forwarding an e-mail from the Provider to the first party, the e-mail comprising a recommendation for the second marketable entity and a URL link to a Web site; and
d. configuring the e-mail from the first party directly to the second party, whereby the first party does not give any identifying information about the second party to the Provider.

20. The method according to claim 19 further comprising the steps of:
a. accessing the Web site by the second party;
b. entering an e-mail address by the second party into a database controlled by the Provider; and
c. offering a reward to the second party to assist in recommending the marketable entity to a third party wherein the recommendation results in a transaction.

21. The method according to claim 20, wherein the method further comprises the step of issuing a reward to select parties according to a constant rewards distribution approach.

22. The method according to claim 21, wherein the constant rewards distribution approach wherein the reward in total remains constant, regardless of how many parties receive a portion of the reward.

23. The method according to claim 22, wherein the constant rewards distribution approach further comprises a tracking system which allows for the Provider to identify the select parties who will be rewarded prior to distribution of the reward.

* * * * *

UNITED STATES PATENT AND TRADEMARK OFFICE
CERTIFICATE OF CORRECTION

| | |
|---|---|
| PATENT NO. | : 7,774,229 B1 |
| APPLICATION NO. | : 11/217871 |
| DATED | : August 10, 2010 |
| INVENTOR(S) | : Howard Dernehl, James E. Kleckner and Robert A. Fraley |

It is certified that error appears in the above-identified patent and that said Letters Patent is hereby corrected as shown below:

IN THE SPECIFICATION

At column 7, line 30, please replace "non-interne" with -- non-internet -- so that the corresponding phrase reads -- non-internet transactions --.

Signed and Sealed this

Fifth Day of October, 2010

David J. Kappos
*Director of the United States Patent and Trademark Office*